(12) United States Patent
Bortnikov et al.

(10) Patent No.: US 11,748,357 B2
(45) Date of Patent: Sep. 5, 2023

(54) METHOD AND SYSTEM FOR SEARCHING A KEY-VALUE STORAGE

(71) Applicant: VERIZON PATENT AND LICENSING INC., Basking Ridge, NJ (US)

(72) Inventors: Edward Bortnikov, Haifa (IL); Eshcar Hillel, Binyamina (IL); Anastasia Braginsky, Haifa (IL); Eran Gilad, Mishmar ha-Emek (IL); Idit Keidar, Haifa (IL); Yonatan Gottesman, Haifa (IL)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 17/572,324

(22) Filed: Jan. 10, 2022

(65) Prior Publication Data

US 2022/0138203 A1    May 5, 2022

Related U.S. Application Data

(63) Continuation of application No. 16/386,496, filed on Apr. 17, 2019, now Pat. No. 11,222,022.

(51) Int. Cl.
*G06F 16/20* (2019.01)
*G06F 16/2455* (2019.01)
*G06F 16/2458* (2019.01)

(52) U.S. Cl.
CPC .... *G06F 16/24562* (2019.01); *G06F 16/2474* (2019.01); *G06F 16/24552* (2019.01); *G06F 16/24558* (2019.01)

(58) Field of Classification Search
None
See application file for complete search history.

(56) References Cited

U.S. PATENT DOCUMENTS

| | | | |
|---|---|---|---|
| 6,292,880 B1 | 9/2001 | Mattis et al. | |
| 8,463,787 B2 | 6/2013 | Kirshenbaum | |
| 8,788,572 B1 | 7/2014 | Walsh et al. | |
| 9,703,768 B1 | 7/2017 | Graham et al. | |
| 2010/0241613 A1* | 9/2010 | Rao | G06F 11/1471 707/674 |
| 2013/0305039 A1 | 11/2013 | Gauda | |

(Continued)

FOREIGN PATENT DOCUMENTS

DE    202012008256    1/2013

OTHER PUBLICATIONS

Office Action dated Apr. 23, 2021 in U.S. Appl. No. 16/386,496.
(Continued)

*Primary Examiner* — Jau Shya Meng

(57) ABSTRACT

The present teaching relates to a method, system and programming for recovering a data storage. In response to a failure of the data storage, a last checkpointed version is retrieved from a checkpoint file created previously for the failure of the data storage. A recovery table is updated to indicate the last checkpointed version and an incarnation number indicating a number of previous recovery of the data storage. The data storage is recovered based on the recovery table. A version number of the last checkpointed version is reset to zero upon a successful recovery of the data storage. The incarnation number is incremented.

20 Claims, 17 Drawing Sheets

(56) References Cited

U.S. PATENT DOCUMENTS

| | | |
|---|---|---|
| 2015/0143064 A1 | 5/2015 | Bhargava et al. |
| 2015/0234931 A1 | 8/2015 | Dageville et al. |
| 2018/0025047 A1 | 1/2018 | Bortnikov et al. |
| 2019/0095263 A1 | 3/2019 | Lahav et al. |
| 2020/0012574 A1* | 1/2020 | Srinivasan ............ G06F 16/168 |

OTHER PUBLICATIONS

Office Action dated Oct. 6, 2020 in U.S. Appl. No. 16/386,505.
Notice of Allowance dated Jan. 22, 2021 in U.S. Appl. No. 16/386,505.

* cited by examiner

METHOD AND SYSTEM FOR SEARCHING A KEY-VALUE STORAGE

CROSS-REFERENCE TO RELATED APPLICATIONS

The present application is a Continuation of U.S. patent application Ser. No. 16/386,496, filed on Apr. 17, 2019, entitled "METHOD AND SYSTEM FOR SEARCHING A KEY-VALUE STORAGE", the contents of which are hereby incorporated by reference in its entirety.

BACKGROUND

The present teaching generally relates a data storage engine.

Key-value storage devices are widely used nowadays by a broad range of applications and are projected to continue to increase in popularity in years to come. Many applications of key-value (KV) storage technologies are characterized by high spatial locality of access, e.g., data items with identical composite-key prefixes are created or scanned together.

KV-stores provide a simple programming model. The data is an ordered collection of key-values pairs. The application can perform random writes, random reads, and range queries. A common design pattern is the use of composite keys that represent an agglomerate of attributes, where the attribute that is most important for range query performance is the key prefix. For instance, in messaging and email applications, keys are typically a concatenation of user id with additional fields such as thread ID, time, etc.

Composite keys induce spatial locality in workloads with high temporal locality, as popular entities (for example, users) result in popular key ranges. Spatial locality may also arise with simple (non-composite) keys, for example in reverse URLs, which are often used as keys for web search indexing. While the prevalence of temporal locality (i.e., frequent access to popular entities) in real-world workloads is widely-recognized, and indeed standard benchmarks feature skewed key-access distributions, these benchmarks fail to capture the spatial aspect of locality.

The de-facto standard approach to building KV-stores today is LSM—log-structured merge trees. The LSM approach optimizes write performance by absorbing random writes in memory and periodically flushing them as sequential files to disk. While sequential disk access dramatically improves I/O throughput, it is important to notice that the LSM design initially groups writes into files temporally, and not by key-range. A background compaction process later merge-sorts any number of files, grouping data by keys.

Such an approach is not ideal for workloads with high spatial locality for two reasons: (i) a popular key range will be fragmented across many files during long periods (between compactions), and (ii) the compaction process is costly both in terms of performance (as it consumes high disk bandwidth) and in terms of write amplification, namely the number of physical writes associated with a single application write. The latter is significant particularly in SSD as it increases disk wear. The temporal grouping of data means that compaction is indiscriminate with respect to key popularity: since new (lower level) files are always merged with old (higher level) ones, a "cold" key range that has not been accessed since the beginning of time continues to be repeatedly re-located by compactions.

Furthermore, because LSM's in-memory component consists only of recently-written keys, it does not contain keys that are frequently read without being modified. In such a scenario, read amplification is increased, where a read operation has to search for the requested key in multiple locations. Furthermore, the design structure of the LSM stores does not naturally lend itself to range scan operations, which are common with composite keys. Additionally, it must be noted that that although LSM's temporal file organization strives to optimize disk I/O, it induces a penalty on in-memory operation. For instance, all keys—including popular ones—are flushed to disk periodically, even though persistence is assured via a separate write-ahead-log (WAL). This increases write amplification and also makes the flushed keys unavailable for fast read from memory. This is particularly wasteful if the system incorporates sufficient dynamic RAM to hold almost the entire working set.

Thus, there is a need for methods and systems that address such limitations.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF EXAMPLE EMBODIMENTS

Figure 1:
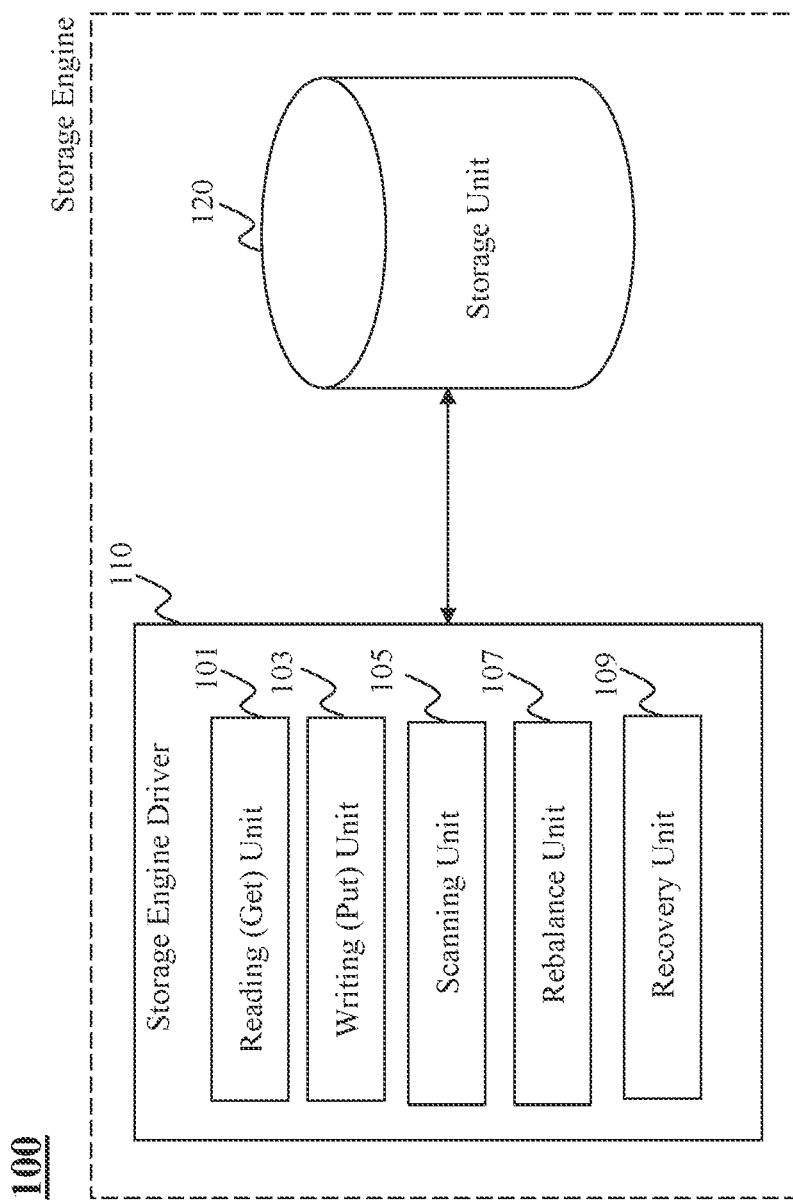
FIG. 1 depicts an exemplary schematic of a storage engine, according to an embodiment of the present teaching.

The teachings disclosed herein relate to methods, systems, and programming for a data storage engine.

One aspect of the present disclosure provides for a method, implemented on a machine having at least one processor, storage, and a communication platform capable of connecting to a network for recovering a data storage. The method comprises the steps of: in response to a failure of the data storage, retrieving, from a checkpoint file created previously for the failure of the data storage, a last checkpointed version; updating a recovery table to indicate the last checkpointed version and an incarnation number indicating a number of previous recovery of the data storage; recovering, based on the recovery table, the data storage; resetting, upon a successful recovery of the data storage, a version number of the last checkpointed version to zero; and incrementing the incarnation number.

By one aspect of the present disclosure, there is provided a system for recovering a data storage. The system comprises a processor and a memory including instructions executed by the processor to perform operations comprising: in response to a failure of the data storage, retrieving, from a checkpoint file created previously for the failure of the data storage, a last checkpointed version; updating a recovery table to indicate the last checkpointed version and an incarnation number indicating a number of previous recovery of the data storage; recovering, based on the recovery table, the data storage; resetting, upon a successful recovery of the data storage, a version number of the last checkpointed version to zero; and incrementing the incarnation number.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a machine readable and non-transitory medium having information recorded thereon for recovering a data storage, wherein the information, when read by the machine, causes the machine to perform: in response to a failure of the data storage, retrieving, from a checkpoint file created previously for the failure of the data storage, a last checkpointed version; updating a recovery table to indicate the last checkpointed version and an incarnation number indicating a number of previous recovery of the data storage; recovering, based on the recovery table, the data storage; resetting, upon a successful recovery of the data storage, a version number of the last checkpointed version to zero; and incrementing the incarnation number.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

According to one embodiment of the present disclosure there is provided a persistent key-value (KV) storage whose design diverges from the ubiquitous log-structured merge (LSM) tree storage systems. The persistent KV storage of the present disclosure optimizes I/O by absorbing updates in memory and performing bulk writes to disk. Further, data is partitioned according to key ranges as opposed to partitioning data in a temporal fashion. Specifically, data is organized (both on disk and in memory) in a plurality of portions (referred to herein as 'chunks') holding contiguous key ranges. Popular chunks are cached in RAM for the benefit of both the write-path and the read path. It must be appreciated that chunks reduce the fragmentation of key ranges, resulting in (1) better read and write performance for workloads with spatial locality, and (2) faster range scan operations. Moreover, since chunks are compacted in memory, writes are flushed to disk less frequently than LSM thereby yielding reduced write amplification, and (4) better performance with memory-resident working sets.

Moreover, as described in detail below, application interfaces (e.g., put, get, and scan interfaces) to the persistent storage of the present disclosure provide strong (i.e., atomic) consistency guarantees on multiprocessor CPU hardware. For instance, the storage system of the present disclosure employs fast concurrent data structures for in-memory processing, to scale with the number of cores. Furthermore, the storage system also provides a near-zero failure recovery time as it does not need to replay WAL on recovery.

The persistent KV storage of the present disclosure is intended to provide strong consistency guarantees for put (write), get (read), and range scan (or scan) operations. Scan operations are atomic in the sense that all key-value pairs returned by a single scan belong to a consistent snapshot reflecting the state of the data store at a unique point in time. Moreover, in order to provide consistent recovery following a crash, the persistent KV store of the present disclosure recovers to a well-defined execution point some time before the crash. The exact recovery point depends on the put persistency model. As described in detail later, the persistent KV storage of the present disclosure provides asynchronous persistence, where put operations are buffered and persisted to disk in the background. This allows applications to trade durability for speed. Data consistency is preserved following recovery, in the sense that if some put is lost, then all ensuing (and thus possibly dependent) puts are lost as well.

According to one embodiment of the present disclosure, the design goals of the persistent KV storage system of the present disclosure are: (1) focus on spatial locality and range scans. Multiple applications embed multi-dimensional data in a single-dimension composite key. This design provides high spatial locality on the primary dimension (key prefix). The persistent KV storage is designed to express this locality in physical data organization in order to exploit it efficiently for scans by the primary dimension. (2) High performance with memory-resident working sets. In order to sustain high speed, key-value stores nowadays leverage increasing DRAM sizes where they can hold most of the active data set. The KV storage system of the present disclosure is designed for maximum performance in this "hyper-local" case. (3) Low write amplification. The KV storage system of the present disclosure is designed to minimize disk writes in order to boost performance and reduce disk wear, especially for SSD devices, and (4) Fast recovery. As crashes are inevitable, the KV storage system's mean-time-to-recovery is achieved in a short time span.

By one embodiment of the present disclosure, in order to achieve the above stated requirements, the KV storage system of the present disclosure is designed with the following design principles: (1) Chunk-based organization: data is organized both on disk and in-memory, in large chunks pertaining to key ranges. Each chunk has a file representation referred to herein as funk (i.e., file chunk), and may be cached in a memory data structure referred to herein as a munk (i.e., a memory chunk). Such an organization exploits spatial locality and is friendly to range scans. Further, to optimize in-memory access, the keys in each chunk are partially sorted and the munks are indexed. To expedite access to keys whose chunks are only on-disk (i.e., have no munks), individual popular keys are cached in a row cache, and Bloom filters are utilized to limit excessive access to disk. (2) Infrequent disk compactions: as long as a chunk is cached (has a munk), its funk's organization does not have to be optimized since queries do not access it. Therefore, the persistent KV storage system of the present disclosure infrequently performs reorganization (compaction) on such funks. Conversely, when a funk holds cold data, its organization hardly deteriorates, and therefore compaction is not necessary. Note that this is unlike traditional LSM storage systems, where all disk components are compacted, regardless of which keys reside in memory and whether keys are hot or cold. (3) Multi-versioning for atomic scans: The persistent KV storage system employs multi-versioning along with copy-on-write to keep data versions required by atomic scans. In other words, if a put operation attempts to overwrite a key required by an active scan, then a new version is created alongside the existing one, whereas versions that are not needed by any scan are not retained. Thus, version management incurs a low overhead (as it occurs only on scans), and (4) In-funk write ahead logs (WALs). The persistent KV storage system of the present disclosure logs writes within funks and avoids duplicating the updates in a separate WAL. This reduces write amplification and expedites recovery.

Turning now to FIG. 1, there is depicted an exemplary schematic of a storage engine 100, according to an embodiment of the present teaching. The storage engine 100 of the present teaching includes a storage engine driver 110 and a storage unit 120. The storage engine driver 110 includes the following components: a record reading unit 101, a record writing unit 103, a records scanning unit 105, a rebalance unit 107, and a recovery unit 109. In what follows, there is provided a detailed description of the operation(s) of each of the processing units included in the storage engine driver 110, as well as a description of the architecture of the storage unit 120.

Figure 2:
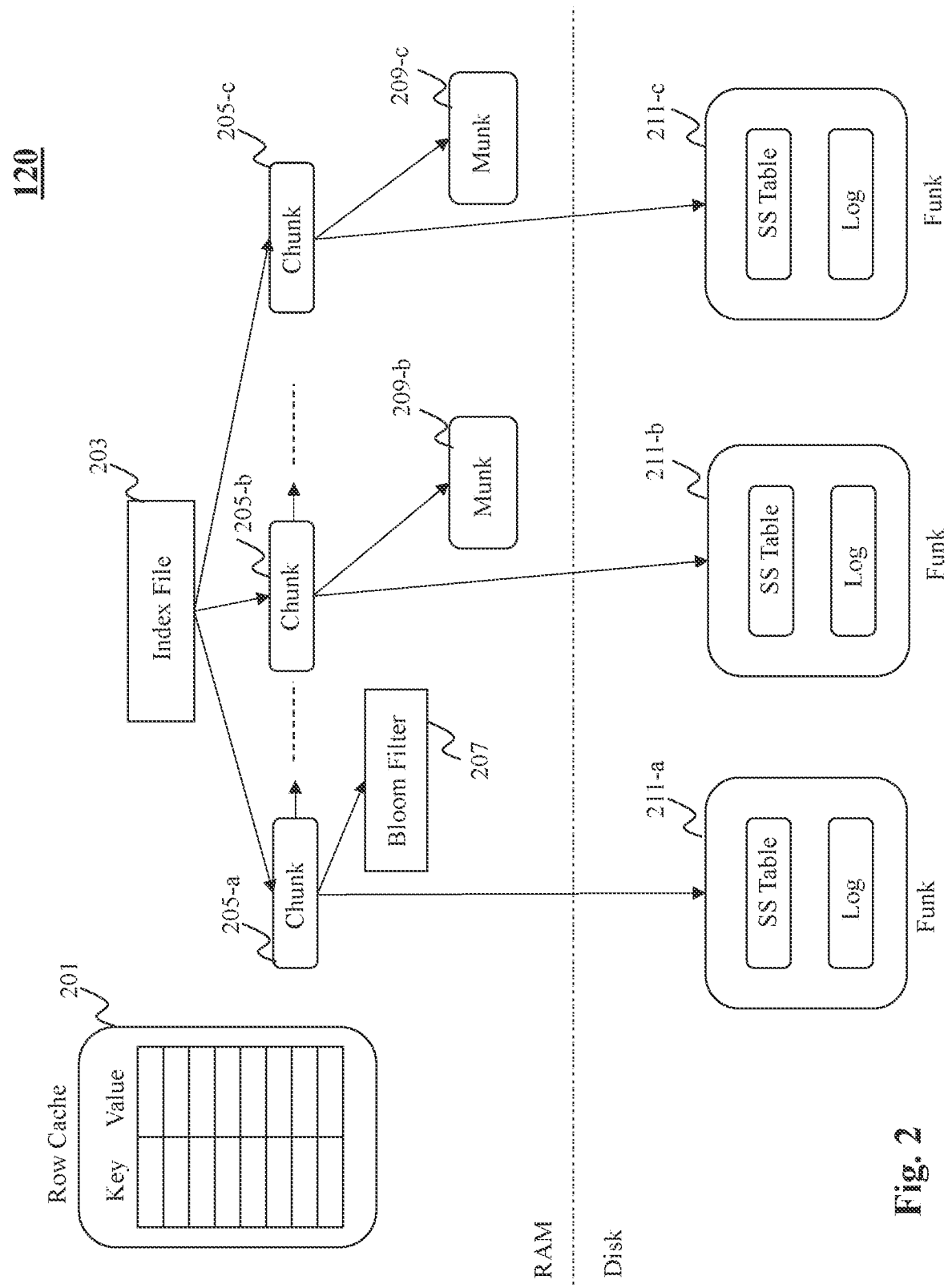
FIG. 2 is an exemplary schematic depicting design of a storage unit included in a storage engine, according to an embodiment of the present teaching.

FIG. 2 is an exemplary schematic depicting a design of a storage unit 120 included in a storage engine 100, according to an embodiment of the present teaching. As shown in FIG. 2, the storage unit 120 includes an in-memory portion (e.g., RAM) and a disk portion. Data resides in fixed-size objects (i.e., chunks) 205-a, 205-b, 205-c, each holding a contiguous key range. In doing so, the efficiency of both disk access and memory access are enhanced, in particular, for range scan operations. At run-time, a list of metadata objects (i.e., chunks' metadata) is maintained in the in-memory portion, where each chunk's data (consisting of keys in the corresponding range and values associated with them) is kept in the disk portion (for persistence), and possibly also in the in-memory portion (for fast access).

In the disk portion of the storage unit 120, each chunk 205-a, 205-b, 205-c, is associated with a corresponding file (referred to herein as a funk) 211-a, 211-b, 211-c. By one embodiment, each funk includes two files: a compacted and sorted key-value map i.e., sorted string table (SS-Table) and a write log. When a funk is created, the SSTable holds all the chunk's keys with their corresponding values, and the log is empty. New key-value pairs are subsequently appended to the unsorted log. If a key is over-written, it remains in the SSTable associated with the old value and is included in the log with the new one. In other words, the log portion of each funk is more up-to-date.

In designing a data storage structure as shown in FIG. 2, provides the benefit of performing from sorted searches on the SSTable, and at the same time allows for updating chunks without re-writing existing data, thus minimizing write amplification. However, as a funk's log grows, searching may become inefficient and the funk may no longer be compact, i.e., it may contain redundant (over-written) values. Therefore, by one embodiment, once the funk's log exceeds a certain threshold, the funk is reorganized via a rebalance process which is described in detail later with reference to FIGS. 7A-7C.

Figure 3:
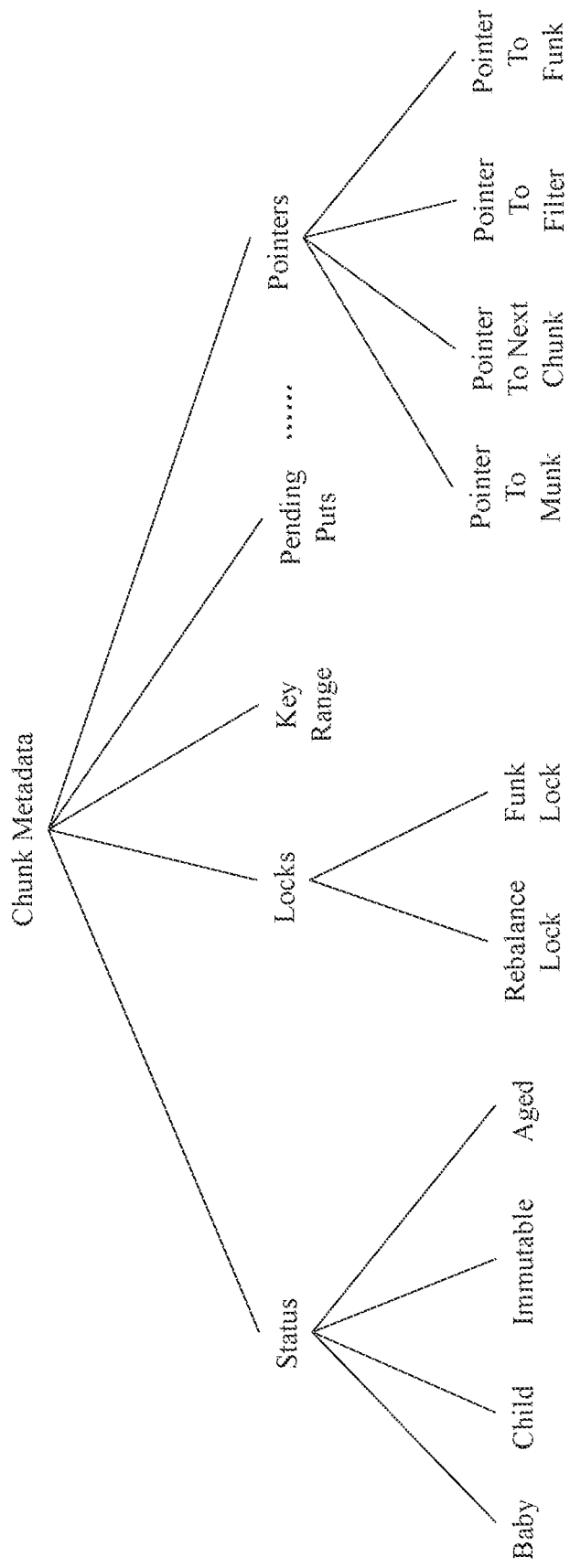
FIG. 3 illustrates exemplary information included in a metadata of a chunk, in accordance with an embodiment of the preset teaching.

By one embodiment, a subset of the chunks are also cached (i.e., stored) in the in-memory portion of the storage unit 120 to allow fast data access. Specifically, each cached chunk is associated with a data structure (referred to herein as a munk) 209-$b$, 209-$c$. It must be appreciated that munks 209-$b$, 209-$c$ are volatile and can be removed and recreated from the corresponding funks at any time. At run-time, the storage unit 120 maintains in-memory, a list of chunk metadata objects as well as index file 203, which is a sorted map that provides a mapping of keys to chunks. Specifically, the index file 203 provides a mapping that enables a determination of which key ranges are associated with which chunks. It must be appreciated that since metadata objects (i.e. chunks 205-$a$, 205-$b$, 205-$c$) do not hold actual keys and values, the chunks are significantly smaller than munks and funks. For instance, each chunk may have a size of less than 1 KB. By one embodiment, exemplary information included in metadata of a chunk object is depicted in FIG. 3.

By one embodiment, each munk 209-$b$, 209-$c$ holds key-value pairs in data structure such as an array-based linked list. When a munk is created, it is sorted by key, so each cell's successor in the linked list is the ensuing cell in the array. As new keys are added, they create bypasses in the linked list, and consecutive keys in the list may no longer necessarily adjacent in the array. Nevertheless, as long as a sizeable prefix of the array is sorted, bypasses are short in expectation. By designing the storage unit 120 in a manner as described above, keys can be searched efficiently via binary search on the sorted prefix and a short traversal of one "bypass". As key-value pairs are added, overwritten, and removed munks and funks undergo reorganization. By one embodiment, the reorganization includes: (1) compaction to deallocate removed and overwritten data, (2) sorting keys to make searches more efficient, and (3) splitting overflowing chunks. It must be appreciated that if a chunk has a munk (i.e., the metadata object is associated with an in-memory data structure), then the rebalance operation compacts and sorts the munk in-memory by creating a new (compacted and sorted) munk instead of the existing one. Funks of munk-less chunks are also compacted by replacing them with new funks, albeit less frequently. All reorganizations are performed the rebalance unit (i.e., unit 107 of FIG. 1), described later with reference to FIGS. 7A-7C.

By one embodiment, as long as a chunk is memory-resident, the munk data structure serves both the read-path and the write-path for keys in this chunk's range. In this case, the chunk metadata can be quickly located using the index file 203 and its corresponding munk's sorted prefix allows for fast binary search. Thus, the storage unit 120 is particularly fast when almost the entire working set is memory-resident. However, in case a particular chunk does not have a corresponding in-memory data structure (i.e., munk), the performance penalty of accessing keys in munk-less chunks can be performed as follows: a row cache 201 (i.e., a table) holding popular key-value pairs can be searched. Unlike munks, which cache key ranges, the row cache 201 stores individual keys, and is thus more effective in dealing with point queries (i.e., get/read operations as opposed to scan operations) with no spatial locality. Thus, popular key ranges can be scanned quickly from munks, while isolated popular keys can be quickly found using the row cache 201.

For working sets that are larger than the available RAM, the row cache 201 and the munks 209-$b$, 209-$c$ may not suffice, and so a certain portion of reads are served from the disk portion. In this case, a sequential search of the log can be performed to access value associated with a particular key. By one embodiment, in order to reduce log searches to a minimum, each munk-less chunk (i.e., a chunk that is only associated with a funk e.g., chunk 205-$a$) includes a Bloom filter 207 associated with the corresponding funk. Specifically, the Bloom filter 207 can be utilized to search the funk's log to retrieve value of a desired key. Further, by one embodiment, the Bloom filter 207 may be partitioned to efficiently search the log of a funk. For instance, in order to reduce log search times, the Bloom filter can be partitioned into a plurality of filters, where each partition of the Bloom filter summarizes content of respective part of the log. In doing so, the partitioned Bloom filters provide for a determination of not only whether or not the log is to be searched, but also which part of the log is to be searched.

Figure 4A:
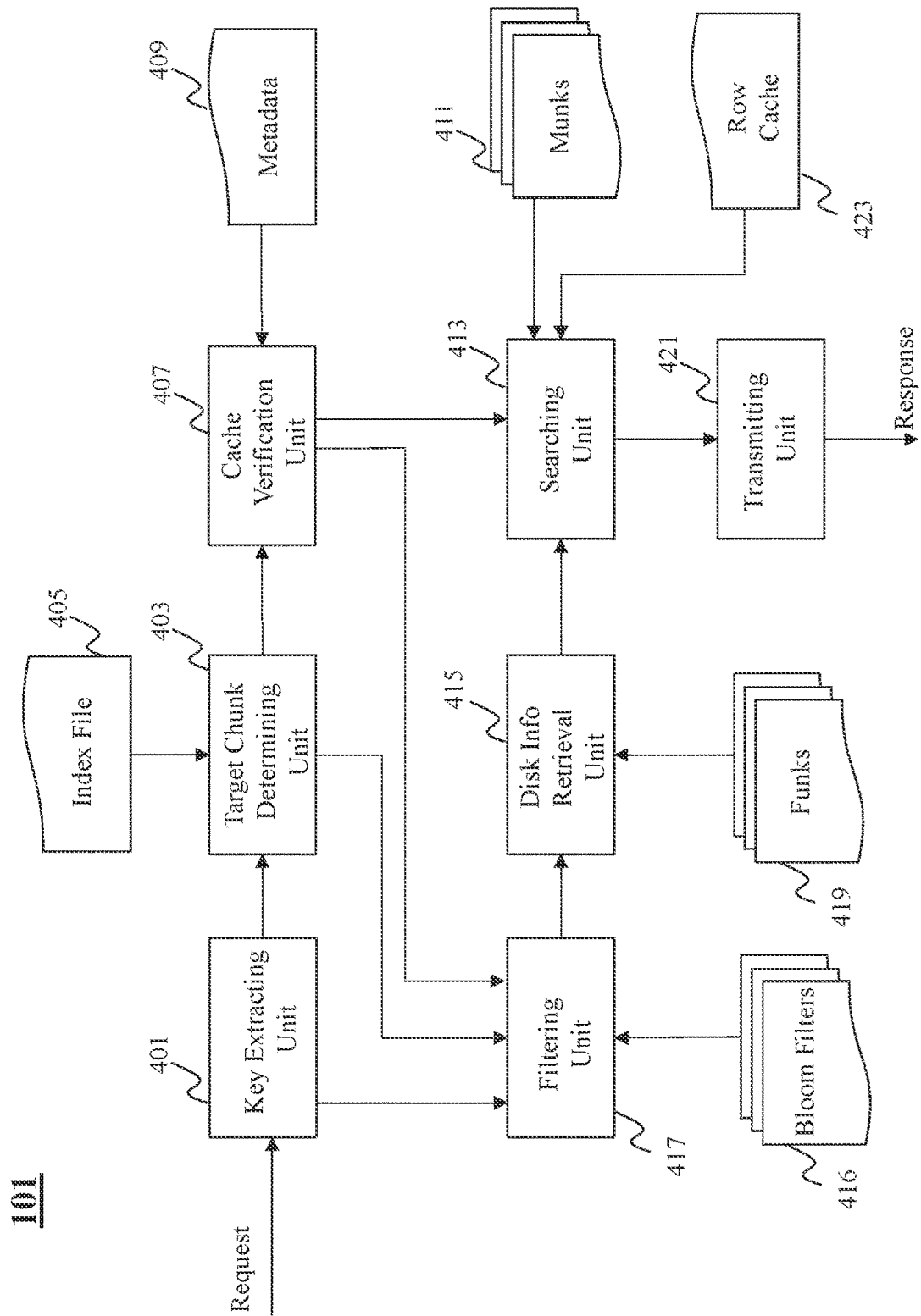
FIG. 4A depicts an exemplary system diagram of a reading unit, according to an embodiment of the present teaching.

Turning now to FIG. 4A, there is depicted an exemplary system diagram of a reading unit 101 included in the storage engine driver 110 of the storage unit 120, according to an embodiment of the present teaching. The reading unit 101 includes a key extracting unit 401, a target chunk determining unit 403, a cache verification unit 407, a searching unit 413, a filtering unit 417, a disk information retrieval unit 415, and a transmitting unit 421.

Upon receiving a request to access value associated with a key, the key extracting unit 401 extracts the key from the request. The target chunk determining unit 403 utilizes the index file 405 (i.e., a mapping of key ranges to chunks) to identify the chunk associated with the extracted key. Upon identifying the chunk, the cache verification unit 407 utilizes the chunks metadata 409 to determine whether the identified chunk is cached in memory. Specifically, the cache verification unit 407 determines whether the identified chunk has a corresponding munk data structure stored in the in-memory portion of the storage unit 120. Note that such a verification may be made by the cache verification unit 407 by reading the pointer to munk in the chunk metadata as shown in FIG. 3.

Upon a successful verification of the existence of a munk, the cache verification unit 407 triggers the searching unit 413 to search the key in the munk 411. For instance, by one embodiment, the searching unit 413 can locate the key in the munk by performing a binary search on the sorted prefixes in the linked list array structure of the munk. If the key is not present in the munk, the searching unit 413 can search for the key in the row cache 423.

By one embodiment, if the cache verification unit 407 determines successfully that the identified chunk does not have a corresponding munk, then the cache verification unit can trigger the filtering unit 417 to determine whether the key may be present in the funk associated with the identified chunk. For instance, by one embodiment, the filtering unit 417 may utilize Bloom filters 416 (e.g., partitioned Bloom filters) to identify, with respect to the key, portions of the log (included in the funk) that may include the key and the corresponding value.

According to one embodiment, the disk information retrieval unit 415 may retrieve the relevant portions of the log from the funk 419, and further the searching unit 413 may search the relevant portion of the log to determine presence of the key in the log. Additionally, the searching unit 413 may also search the SS Table included in the munk to search for the presence of the key. The searching unit 413 upon successfully locating the key in any one of the munk 411, the row cache 423, or the funk 419 obtains the corresponding value associated with the key and transmit the result (in response to the request) via the transmitting unit 421. If the key is not found in any one of the three locations (i.e., munk, row cache, and funk), the searching unit may be configured to transmit a 'key not found' message in response to the request.

Figure 4B:
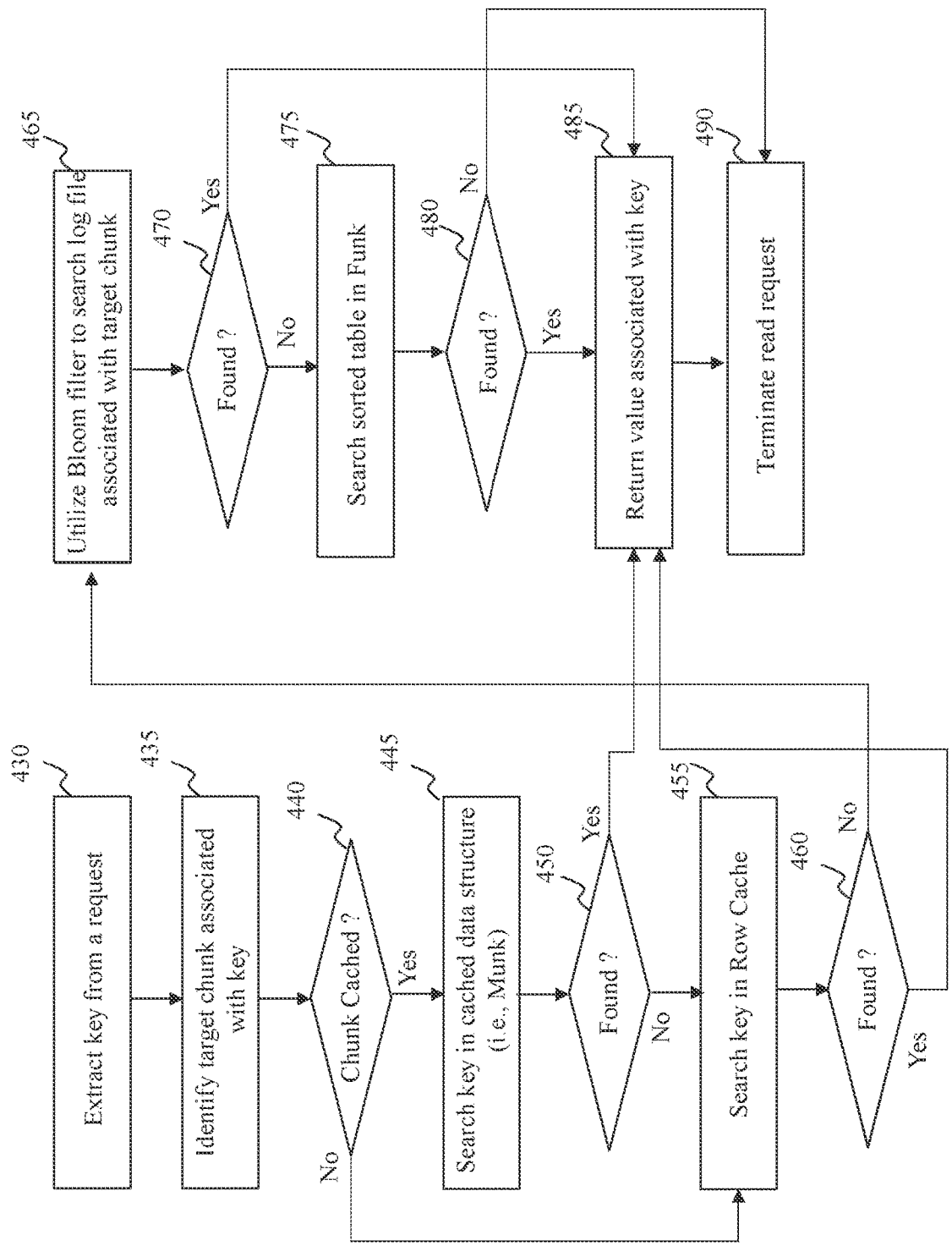
FIG. 4B is a flowchart of an exemplary process performed by a reading unit, according to an embodiment of the present teaching.

FIG. 4B depicts a flowchart of an exemplary process performed by a reading unit, according to an embodiment of the present teaching. The process commences in step 430 wherein a key is extracted from a received request. In step 435, a target chunk associated with the key is identified. In step 440, a query is performed to determine whether the identified chunk is cached in-memory. Specifically, a query is performed to determine whether the identified chunk is associated with a munk. If the response to the query is affirmative, the process moves step 445, else the process moves to step 455.

In step 445, the key is searched in the munk data structure (e.g., linked list), for instance by performing a binary search. If the key is successfully found in the munk, the process moves to step 485, else the process moves to step 455. In step 455, the reading unit accesses the row cache (stored in-memory) to determine whether the requested key is stored in the row cache. If the key is found in the row cache, the process moves to step 485, else the process proceeds to step 465.

In step 465, the reading unit utilizes the Bloom filter associated with the target chunk to search for the key in the funk (i.e., file) associated with the target chunk. Specifically, the reading unit may search the log files in the funk to search for the requested key. Further, in step 470, a query is performed to determine whether the key is found in the logs of the funk. If the response to the query is affirmative, the process moves to step 485, else the process moves to step 475. In step 475, the reading unit searches the sorted table (i.e., SS Table) included in the funk to determine the presence of the key in the funk. If the key is found in the SS Table (step 480), the process moves to step 485, else the process moves to step 490. In step 485, the reading unit returns the value associated with the requested key, whereas if the requested key is not found in any one of the munk, row cache, or the munk, the reading unit terminates the get/read operation in step 490.

In what follows, there is provided an operational description of the writing unit 103 that is configured to write (i.e., put) a value associated with a key, and the scanning unit that is configured to scan (i.e., read) values associated with a range of keys. According to one embodiment, the storage engine 100 of the present disclosure is configured to synchronize put operations with scan operations, as well synchronize put operations with a rebalance (i.e., reorganizing) operation. Additionally, the storage engine also provisions for the feature of multi-versioning of scan operations as described below.

The replacement of a chunk (due to a split) or reorganization of a funk or munk must be executed atomically and be synchronized with concurrent put operations. According to one embodiment, this is controlled by a lock referred to herein as a chunk's rebalance lock. The rebalance lock is held for short time periods during chunk, funk, and munk reorganization. The rebalance lock is a shared/exclusive lock, acquired in shared mode by put operations and in exclusive mode by the rebalance unit 107. It must be noted that get/read operations and scan operations do not acquire the rebalance lock.

Furthermore, by one embodiment, in order to minimize I/O operations, the storage engine 100 of the present disclosure allows at most one thread (operation) to rebalance a funk at a given time. The rebalancing of the funk by a thread is controlled by another lock referred to herein as a funk change lock. In operation, the funk change lock is held throughout the creation of the new funk. In one implementation, the lock can be acquired for instance, using a try lock call, and threads that fail to acquire the lock do not retry, but instead wait for the winning thread to complete the funk's creation.

In order to achieve synchronization, the storage engine 100 maintains a system wide global version (GV) parameter for supporting atomic scan operations and tracks active threads' activities in a Pending Operations (PO) array. The PO includes one entry per active thread. The PO is used to synchronize puts with scans, as well as for garbage collection purposes i.e., old versions not needed by any active scan can be reclaimed.

By one embodiment, a scan operation creates a snapshot associated with GV's current value by incrementing GV, thereby signaling to ensuing put operations that they must not overwrite values associated with smaller versions than the new GV value. It must be appreciated that this resembles a copy-on-write approach, which virtually creates a snapshot by indicating that data pertaining to the snapshot should not be modified in place. Further, to allow garbage collection of old versions, the storage engine 100 tracks snapshot times of active scans in the pending operations array, PO. The compaction process that runs as part of rebalance operation (described later with reference to FIGS. 7A-7C) removes old versions that are no longer required for any scan listed in PO. Specifically, for each key, it removes all but the last version that is smaller than the minimal scan entry in PO and also smaller than the value of GV when the rebalance begins.

A put operation obtains a version number from GV without incrementing it. Thus, multiple puts may write values with the same version, each over-writing the previous one. If a put operation obtains its version before a scan increments the GV, then the new value must be included in the scan's snapshot. However, because the put operation's access to the GV and the insertion of the new value to the chunk do not occur atomically, a subtle race may arise. For instance, consider a put operation that obtains version 7 from GV and then stalls before inserting the value to the chunk, while a scan obtains version 7 and increments GV to 8. The scan operation may then proceed to read the appropriate chunk and may not find the new value although it should be included in its snapshot.

By one embodiment, to remedy the above stated problem, the storage engine of the present disclosure has put operations announce (in the PO) the key they intend to change when beginning their operations, and have scans wait for relevant pending puts to complete. That is, a put operation first registers itself in PO with the key it intends to put (i.e., write). It then reads GV and sets the version field in its PO entry to the read version. After completing the actual put (in the appropriate funk and munk), it unregisters itself in PO (i.e., indicates that the put is complete). In contrast, a scan operation waits for the completion of all pending puts that might affect it—these are put operations whose updates are in the scanned key range, and either do not have a version yet or have versions lower than the scan time.

Figure 5A:
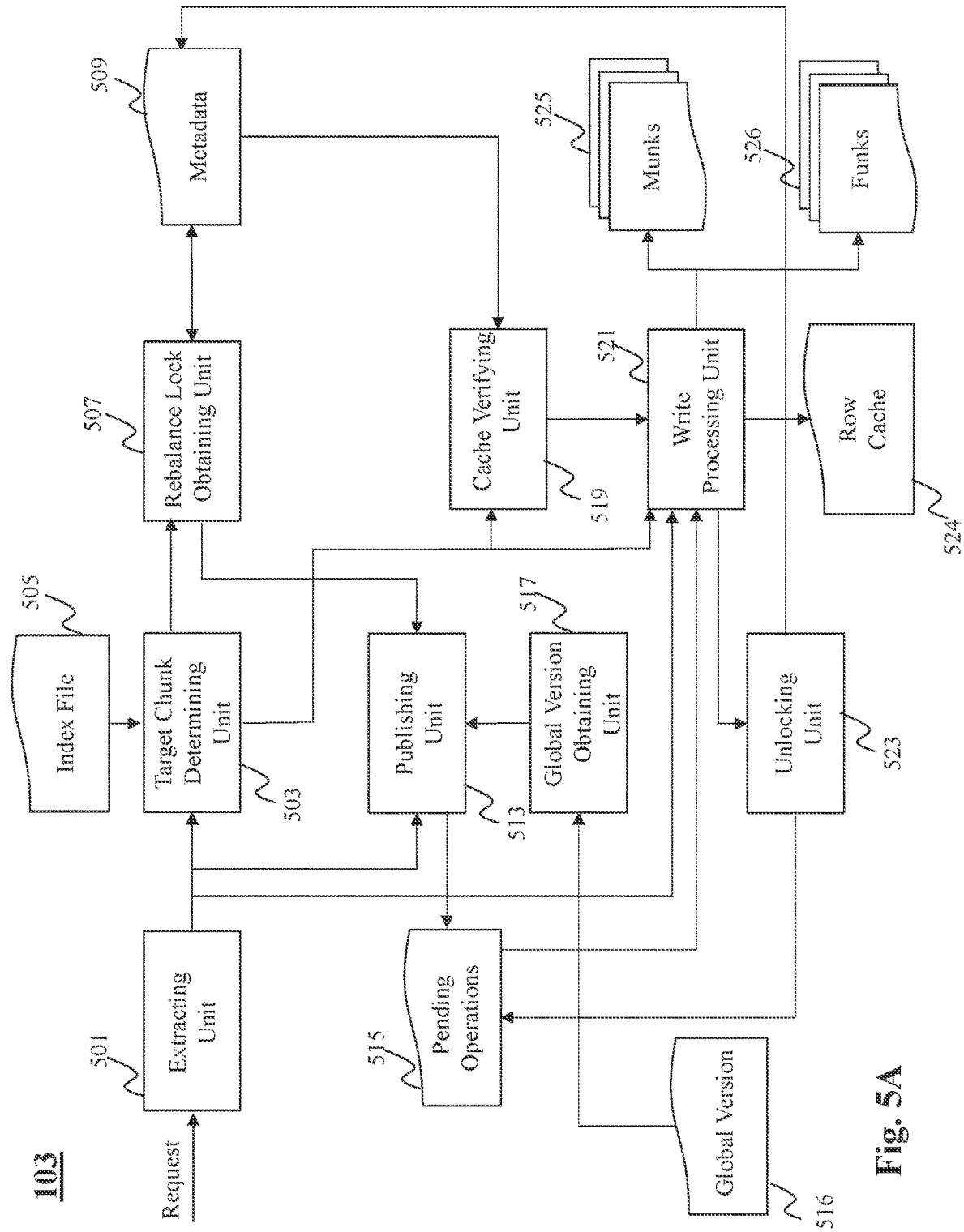
FIG. 5A depicts an exemplary system diagram of a writing unit, according to an embodiment of the present teaching.

Turning now to FIG. 5A, there is depicted an exemplary system diagram of a writing unit 103 included in the storage engine 100, according to an embodiment of the present teaching. The writing unit 103 includes an extracting unit 501, a target chunk determining unit 503, a rebalance lock obtaining unit 507, a publishing unit 513, a global version obtaining unit 517, a cache verifying unit 519, a write processing unit 521, and an unlocking unit 523.

In operation, upon receiving a write request, the extracting unit 501 extracts a key and value from the request. The target chunk determining unit 503 utilizes the extracted key and an index file 505 to identify a target chunk associated with the key. Upon identifying the target chunk, the writing unit 103 utilizes the rebalance lock of the identified chunk in a shared mode. By one embodiment, and referring to FIG. 3, the rebalance lock of each chunk may be implemented as a binary variable. The write request may obtain, via the rebalance lock obtaining unit 507, the rebalance lock of the chunk by accessing the metadata 509 of the chunk, and updating the binary variable e.g., updating the binary variable from 0 (indicating lock is available) to 1 (indicating the lock is being acquired by the request).

Upon obtaining the rebalance lock, the write request publishes its presence by inserting the extracted key into a pending operations (PO) array 515. Further, the global version obtaining unit 517 reads the global version (GV) parameter and publishes (via using the publishing unit 513), the obtained GV to the corresponding entry in the PO. Note that the write operation only reads the GV parameter and does not increment it. It must be appreciated that in an alternate implementation, a write request can obtain the rebalance lock associated with a chunk by simply publishing its presence on the PO. Further, the cache verifying unit 519 is configured to determine whether the identified chunk (i.e., determined by the target chunk determining unit 503) is cached in-memory. Specifically, the cache verifying unit 519 is configured to determine whether the identified chunk is associated with a munk.

By one embodiment, the writing process proceeds as follows: upon publishing in the PO, the write request proceeds to write (using the write processing unit 521) the new key-value pair in a log of the funk 526 associated with the identified chunk. Further, upon a successful verification (made by the cache verifying unit 519) that the identified chunk is associated with a munk, the write processing unit inserts <key, value, gv> into the munk e.g., inserts the <key, value, gv> into the linked list data structure of the munk. Moreover, the write processing unit 521 also updates the row cache 524 in case the key is present there. Upon completion of the writing process, the unlocking unit 523 releases the acquired rebalance lock of the chunk for example, by changing the binary variable in the chunks metadata back to 0 and unregisters the write operation from the PO array 515.

Figure 5B:
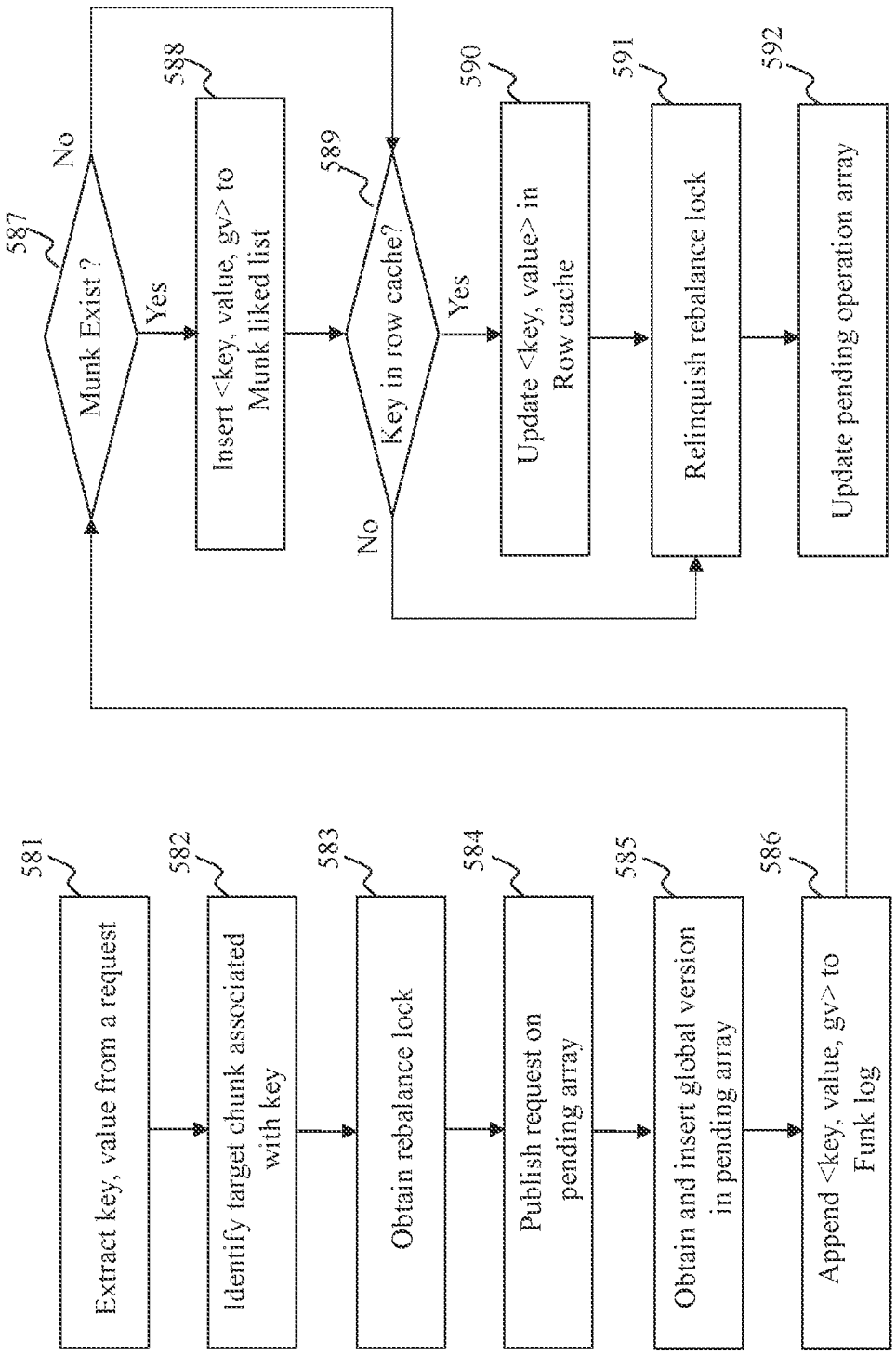
FIG. 5B is a flowchart of an exemplary process performed by a writing unit, according to an embodiment of the present teaching.

FIG. 5B depicts a flowchart of an exemplary process performed by a writing unit, according to an embodiment of the present teaching. The process commences in step 581 wherein a key and value are respectively extracted from the request. In step 582, a target chunk associated with the key is identified. The process then moves to step 583, wherein a rebalance lock associated with the identified chunk is obtained. Further, the request is published to the pending operations array in step 584.

The process in step 585 obtains the global version parameter and publishes it in the pending operations array. Upon publishing the write request in the pending operations array, the process appends <key, value, gv> to a log of a funk associated with the identified chunk.

Thereafter, in step 587, a query is performed to determine whether the identified chunk is associated with a munk. If the response to the query is affirmative, the process moves to step 588, else the process moves to step 589. In step 588, the <key, value, gv> is inserted into the munk i.e., into a linked list. In step 590, a query is performed to determine whether the key exists in a row cache stored in the in-memory portion of the storage unit. If the response to the query is affirmative, the process moves to step 590, where the <key, value> is updated in the row cache. However, if the response to the query is negative, then in step 591, the process relinquishes the rebalance lock, where after the process unregisters the write request from the PO array in step 592.

Figure 6A:
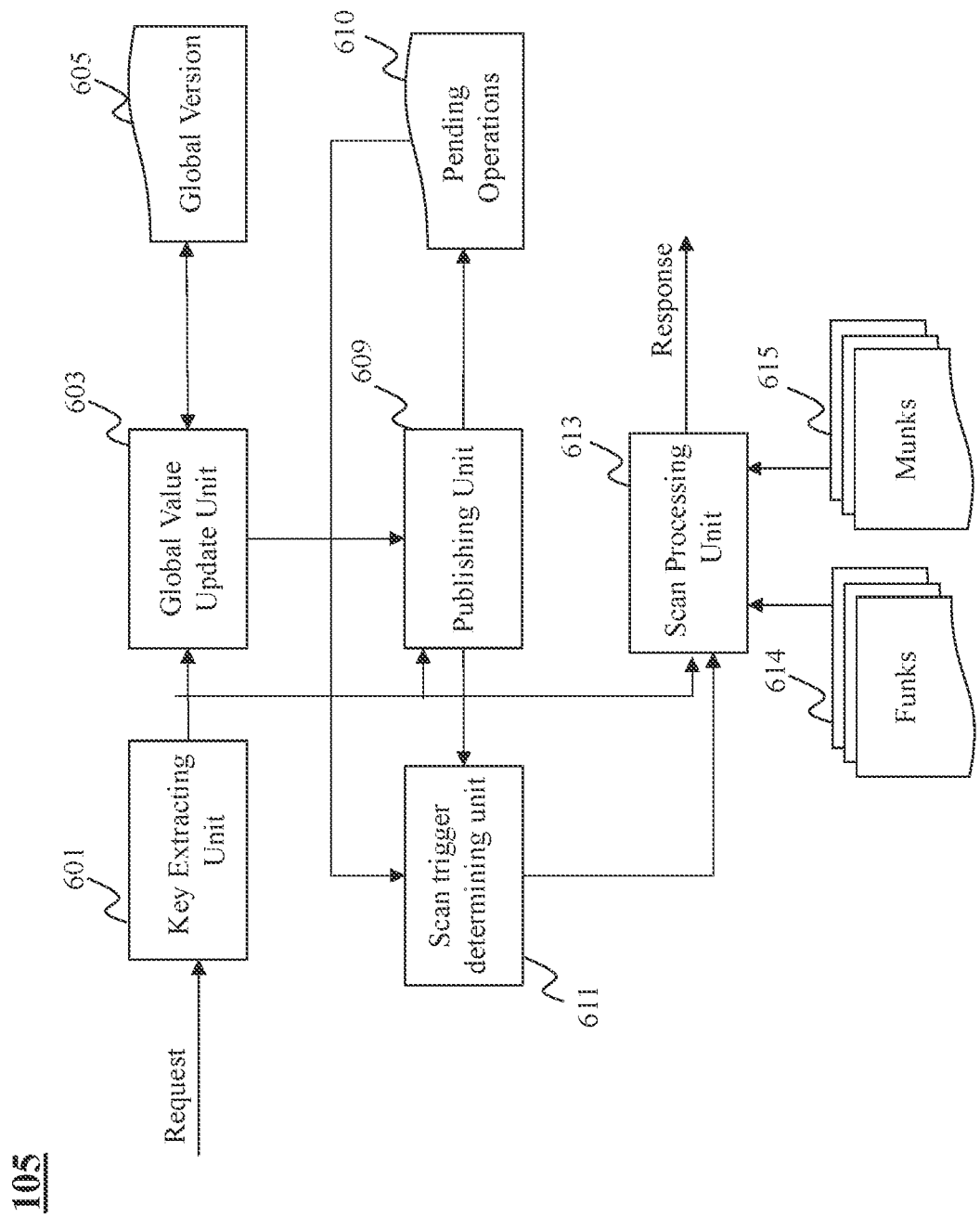
FIG. 6A depicts an exemplary system diagram of a scanning unit, according to an embodiment of the present teaching.

FIG. 6A depicts an exemplary system diagram of a scanning unit 105, according to an embodiment of the present teaching. The scanning unit 105 is configured to read values associated with a key range e.g., [key1 to key2]. The scanning unit includes a key extracting unit 601, a global value update unit 603, a publishing unit 609, a scan trigger determining unit 611, and a scan processing unit 613.

Upon receiving a scan request, the key extracting unit 601 extracts keys i.e., key1 and key2 corresponding to a range of keys. The global value update unit retrieves and increments the value of GV 605. Further, the publishing unit 609 publishes in the PO array 610, the key range along with the GV to signal to concurrent rebalance operations not to remove versions it needs.

By one embodiment, the scan trigger determining unit 611 synchronizes a scan operation with respect to put operations. Specifically, the scan trigger determining unit 611 analyzes the PO array 610 to determine put operations that are updating keys in the requested scan range i.e., in the range from key1 to key2. The scan trigger determining unit 611 determines whether a triggering condition is satisfied. Specifically, the scan trigger determining unit 611 waits for pending put operations that affect its key range R [i.e., key1 to key2] to complete or obtain larger versions i.e. put operation has a larger version than GV. Upon completion of processing the pending put operations in the PO array 610, the scan trigger determining unit 611 triggers the scan processing unit 613 to perform the requested scan i.e., read values of the requested key range.

By one embodiment, the scan processing unit 613 collects the relevant values from all chunks in the scanned range. Specifically, if the chunk has a munk, the scan reads from the munk 615, for each key in its range, the latest version of the value that precedes its snapshot time. Otherwise, the scan processing unit collects all the relevant versions for keys in its range from both the SSTable and the log from the funk 614 and thereafter merges the results.

Figure 6B:
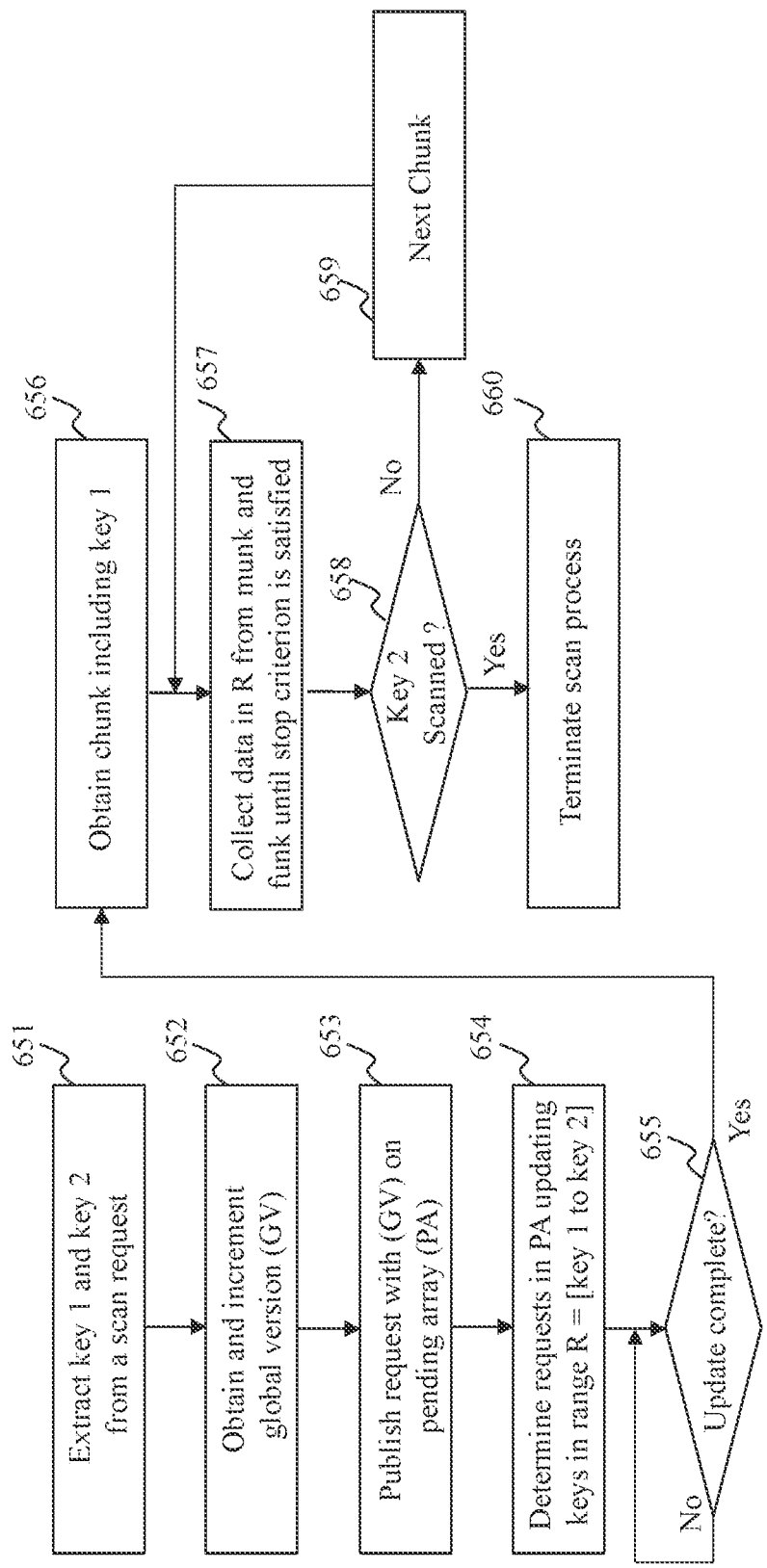
FIG. 6B is a flowchart of an exemplary process performed by a scanning unit, according to an embodiment of the present teaching.

Turning to FIG. 6B, there is depicted a flowchart of an exemplary process performed by a scanning unit, according to an embodiment of the present teaching. The process commences in step 651, wherein key1 and key2 corresponding to a range of keys is extracted from a request. The process in step 652 obtains and increments the global version parameter (GV). In step 653, the scan request is published on a pending operations array along with the GV.

Further, the process moves to step 654 wherein put operation requests in the PA that intend to update/modify the keys in the range R from key1 to key2 are determined. In step 655, the process enters a wait phase, wherein the scan request waits for the determined put operations to complete.

Upon completion of the put operations, the chunk corresponding to key1 is obtained in step 656. The process then moves to step 657 to collect data in the key range (R) from munks and funks until a stopping criterion is satisfied. Specifically, the stopping criterion corresponds to determining whether value associated with key2 has been scanned (step 658). If the stopping criterion is not satisfied, the process moves to step 659 to proceed scanning from the next chunk i.e., repeat step 657. If the stopping criterion of step 658 is satisfied, the process moves to step 660 and terminates the scan request.

According to one embodiment of the present disclosure, the storage engine 100 includes a rebalance unit 107 that is configured to reorganize data in a in a chunk's funk or munk. In what follows, there is provided a detailed description of the reorganization techniques of the present disclosure followed by a description of components included in the rebalance unit 107.

Reorganization (also referred to herein as rebalancing) includes removing old versions that are no longer needed for scans, removing deleted items, and sorting all the keys in the chunk. The reorganization process can be invoked by a thread attempting to access the chunk or a dedicated background thread. It must be notes that rebalance of a funk is important for two reasons: (a) to reduce the time spent searching for a key in the log, and (b) to reduce disk space occupancy. By one embodiment, in case a chunk has a munk, rebalancing reorganizes only the munk, since all searches are served by it. The respective funk is reorganized much less frequently, only in order to bound disk space occupancy.

Reorganization involves creating a new funk or munk to replace the current one. In some cases, the chunk itself can be split (due to overflow), creating new funks (and munks if applicable). It must be notes that as the new funk or munk contains the same relevant data as the replaced one, get and scan operations can proceed uninterrupted while rebalancing is taking place. However, in order to avoid data loss, put operations need to wait. To this end, a munk rebalance begins by obtaining the chunk's rebalance lock in exclusive mode, thereby blocking put operations, which acquire the lock in shared mode. When the lock is held, the chunk is immutable, and otherwise it is active. When the new munk is ready, the rebalance process replaces the munk pointer in the chunk and releases the rebalance lock, thus re-activating the chunk.

Since funk reorganization may take a long time, the chunk is kept active while the new funk is created, and then made immutable for a short time. In order to avoid redundant I/O, by one embodiment of the present disclosure, a funk change lock is used to ensure that only one thread works to create a new funk. Once the thread completes, the rebalance unit acquires the rebalance lock in exclusive mode and copies to the new chunk any new items added to log in the old chunk before it became immutable. When this is done, the rebalance unit replaces the funk pointer in the chunk and releases the lock, thereby re-activating the chunk.

By one embodiment, rebalancing trigger may occur due to a chunk overflow. In this case the chunk is to be split into two new chunks. In case of a split, the chunk is immutable when two new chunks are created to replace the old chunk. If the chunk has a munk, the munk is also split to form two new munks and appropriate pointers (e.g., funk pointers as shown in FIG. 3) in the new chunks are updated to reflect the split. Since creating new funks involves I/O, it is desired to not keep the new chunks immutable for the duration of this process, but rather allow funk creation to proceed in the background while the two new chunks still point to the same old funk.

Referring to FIG. 3 which depicts different statuses of a chunk, by one embodiment, after replacing the old chunk in the list with the two new ones, the old chunk is still accessible via the chunk index (even though it is no longer in the list). The new chunks are therefore created in baby status, indicating that they are still immutable. Once the new chunks are indexed, the old chunk is aged, and the new chunks can become mutable. At this point, the status of the chunk is changed to child, indicating that they are no longer immutable, but share a funk with another chunk, and so should not be rebalanced. Once the funk split completes, the chunk is made immutable in order to complete the funk switch, and then change their status to active.

Figure 7A:
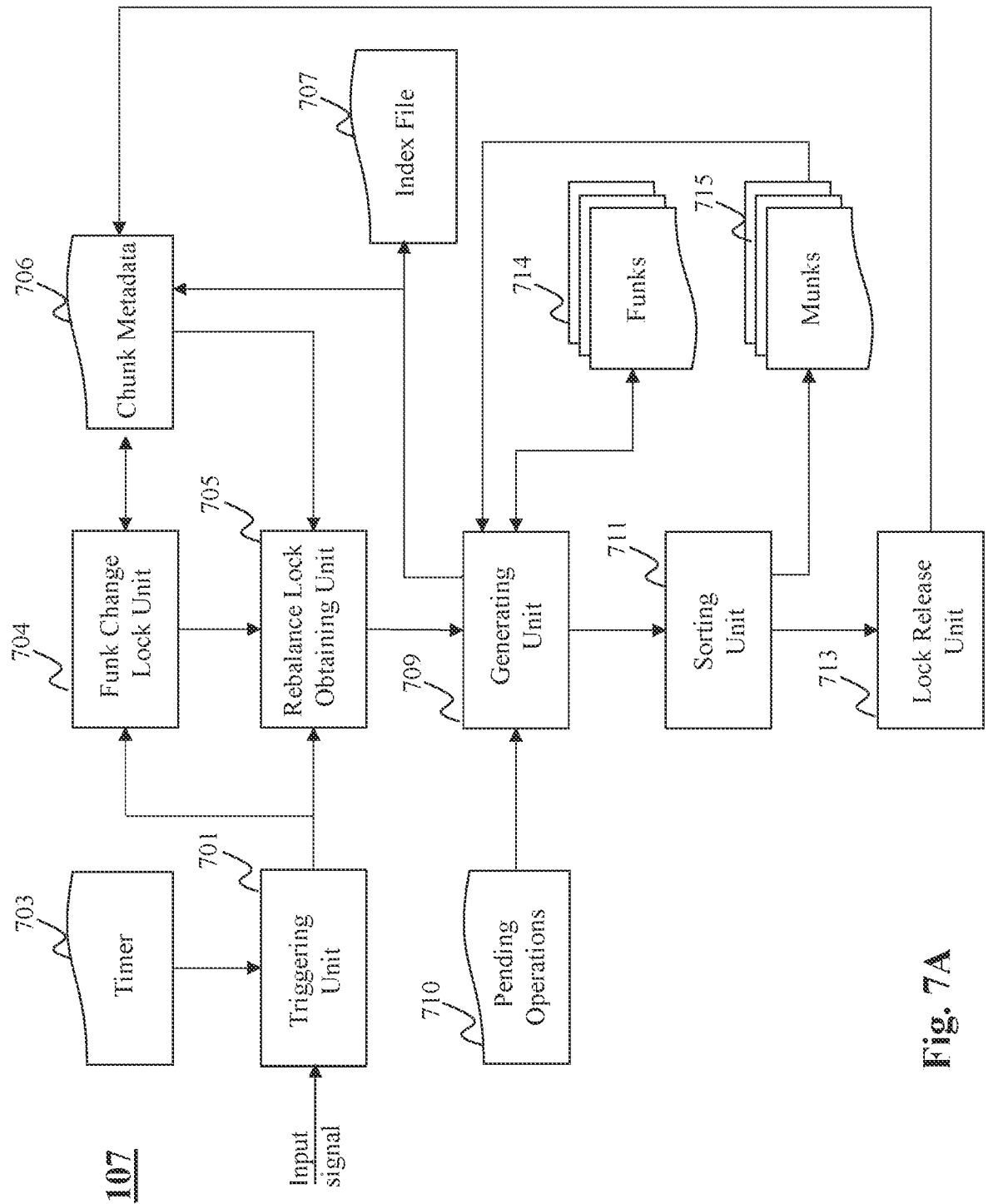
FIG. 7A depicts an exemplary system diagram of a rebalance unit, according to an embodiment of the present teaching.

FIG. 7A depicts an exemplary system diagram of the rebalance unit 107, according to an embodiment of the present teaching. The rebalance unit 107 includes a triggering unit 701, a rebalance lock obtaining unit 705, a funk change lock unit 704, a generating unit 709, a sorting unit 711, and a lock release unit 713. The triggering unit 701 may receive a timed signal (at predetermined time intervals) from a timer 703 indicating activation of the rebalance process. Alternatively, the triggering unit 701 may receive an input signal e.g., from a thread initiating a rebalance process, a chunk overflow signal etc., that initiates the rebalance process.

For rebalancing of a munk, upon receiving the trigger from the triggering unit 701, the rebalance lock obtaining unit 705 obtains the rebalance lock associated with the chunk (included in chunks metadata 706 and shown in FIG. 3) in an exclusive mode. Note that upon obtaining the rebalance lock, the rebalance unit 107 blocks any put operations from updating any information.

Upon obtaining the rebalance lock, the generating unit 709 retrieves the munk under consideration 715 (i.e., the old munk which is to be replaced) and creates a new munk, to include relevant data of the old munk. By one embodiment, relevant data may be determined based on information included in the pending operations array 710. In this manner, cold data i.e., data which is not required by any active operations may be ignored and not incorporated into the new munk. Furthermore, by one embodiment, upon identifying the relevant data, the sorting unit 711 may sort the data to be included in the new munk. Note that sorting information included in the new munk enables faster search operations. Upon completion of creating the new munk, the generating unit 709 updates the chunk metadata 706 to modify the pointers e.g., munk pointer to point to the newly created munk. Thereafter, the lock release unit 713 relinquishes the rebalance lock.

As stated previously, funk reorganization is seldomly performed. Since funk reorganization may take a long time, the chunk is kept active while the new funk is created, and then made immutable for a short time. In order to avoid redundant I/O, by one embodiment of the present disclosure, the funk change lock unit 704 ensures that only one thread works to create a new funk. Once the thread completes, the rebalance lock obtaining unit 705 acquires the rebalance lock in exclusive mode and copies (via the generating unit 709) to the new funk 714 any new items added to log in the old chunk before it became immutable. Upon completion, the generating unit 709 replaces the funk pointer in the chunks metadata 706 and releases the lock, thereby re-activating the chunk. The rebalance of an old chunk into new chunks caused due to chunk overflow is executed in a manner similar to that as described above. Specifically, If the chunk has a munk, we split the munk (by creating two new munks) and update the appropriate pointers in the new chunks. Additionally, in this case, the generating unit 709 updates information in the index file related to the creation of the new chunks and updates the status of the newly created chunks as described previously.

Figure 7B:
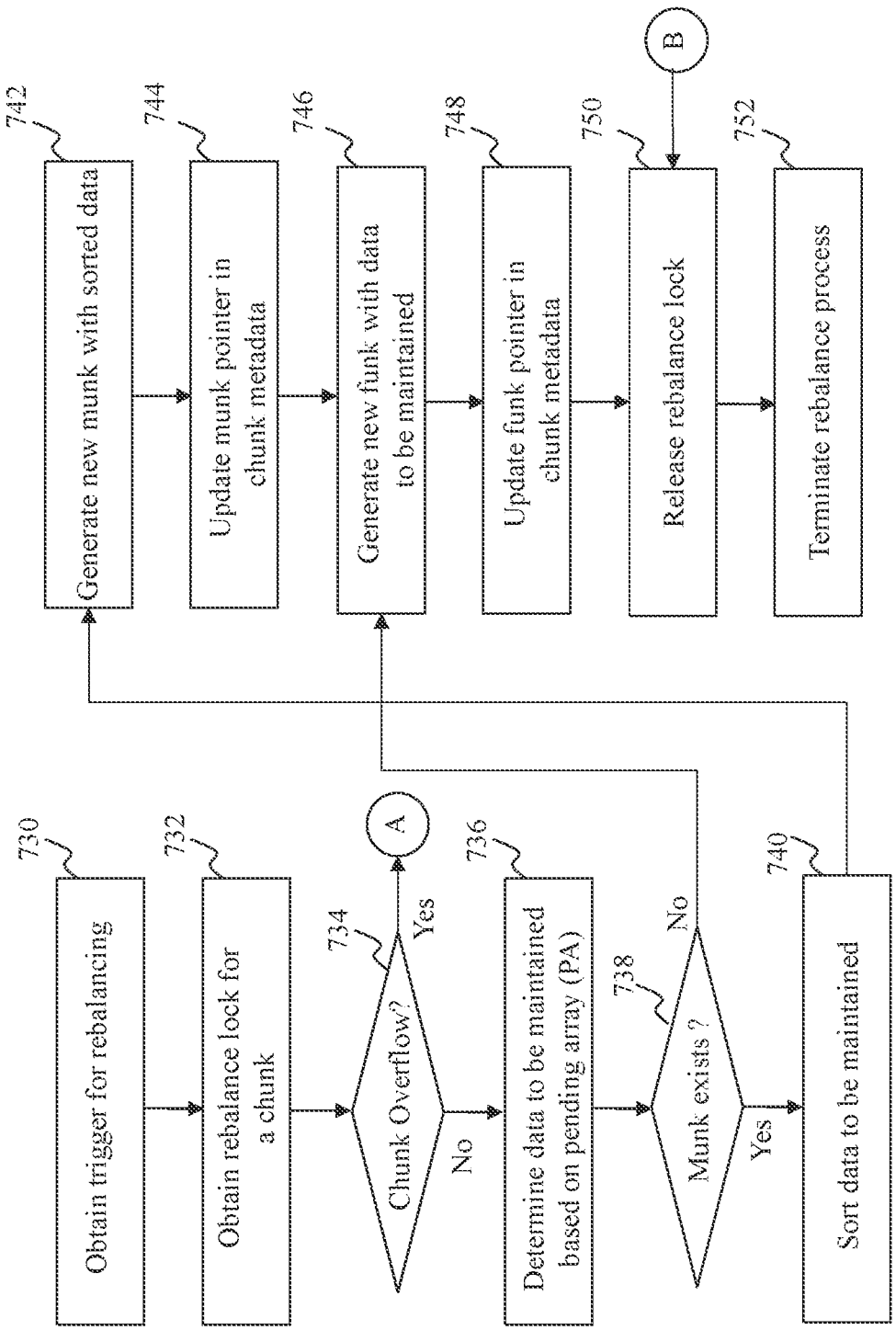
FIG. 7B and FIG. 7C depict flowcharts of an exemplary process performed by a rebalance unit, respectively, according to an embodiment of the present teaching.
Figure 7C:
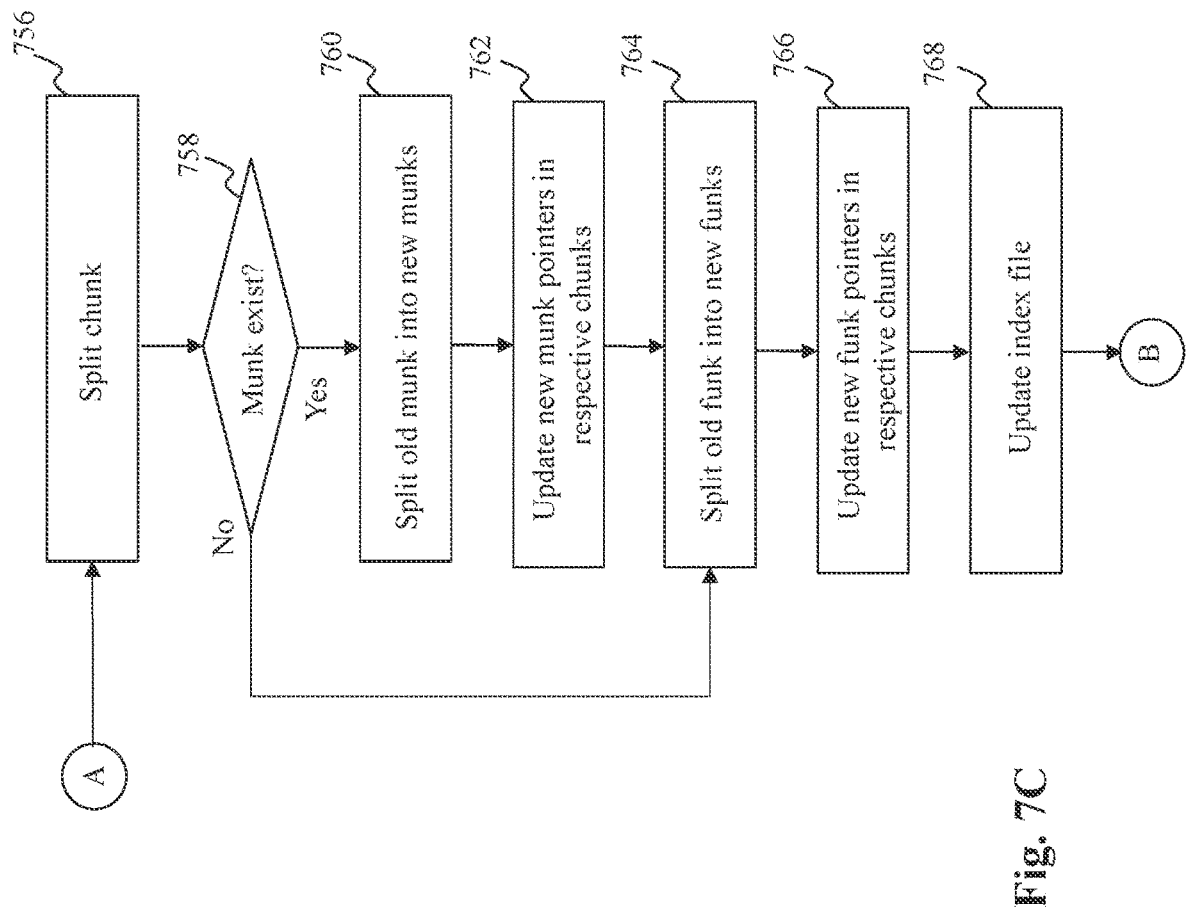

FIG. 7B and FIG. 7C depict flowcharts of an exemplary process performed by a rebalance unit, respectively, according to an embodiment of the present teaching. The process commences in step 730, wherein the rebalance unit obtains a trigger for rebalancing a chunk's munk and/or funk. In step 732, the rebalance unit obtains a rebalance lock associated with the chunk that is to be rebalanced.

The process then moves to step 734, wherein a query is performed to determine whether there is a chunk overflow. If the response to the query is affirmative, then the process moves to step 756 in FIG. 7C. If the response to the query is negative, the process moves to step 736.

In step 736, data that is to be included in the newly created munk or funk is determined based on the pending operations array. The process then moves to step 738, wherein a further query is performed to determine whether the chunk is associated with a munk. If the response to the query is affirmative, the process moves to step 740, else the process moves to step 746.

In step 740, the rebalance unit sorts the data that is to be included in the new munk. In step 742, the rebalance unit creates the new munk and stores the sorted data in the new munk. Further, in step 744, the rebalance unit updates the chunk metadata (e.g., pointer to munk) to reflect the newly created munk.

In step 746, the rebalance unit generates a new funk and includes the data to be maintained in the new funk. It must be appreciated that in case a chunk has a munk, the rebalancing process as described above usually reorganizes only the munk, since all searches are served by it. The respective funk is reorganized much less frequently, only in order to bound disk space occupancy.

In step 748, the rebalance unit updates the funk pointer in the chunk metadata. Upon rebalancing the munk and/or funk, the rebalance unit releases the rebalance lock associated with the chunk and terminates the rebalance process in step 752.

Turning to FIG. 7C, there is depicted the rebalancing steps included for the case of rebalancing a chunk (caused for instance due to overflow). In step 756, the chunk is split into multiple chunks e.g., two chunks. In step 758, a query is performed to determine whether the chunk is cached in-memory. Specifically, a query is made to determine whether the chunk is associated with a munk. If the response to the query if affirmative, the process moves to step 760, else the process moves to step 764.

In step 760, the old munk associated with the old chunk is split into new munks and data associated with the old chunk is maintained in the newly created munks. In step 762, the pointers associated with the newly created munks are updated in the metadata of the newly created chunks, respectively.

The process in step 764, splits the old funk (associated with the old chunk) in new funks, and data associated with the old chunk is maintained in the newly created funks. Further, in step 768, the pointers associated with the newly created funks are updated in the metadata of the newly created chunks, respectively. Thereafter, the process loops back to step 750 (FIG. 7A) wherein the rebalance lock is released and subsequently the rebalancing process is terminated in step 752.

As stated previously, the storage engine 100 of the present disclosure provides for consistent crash recovery with near-instant recovery time. By one embodiment of the present disclosure, the storage engine 100 supports two modes of recovery operations: a synchronous mode and an asynchronous mode. In the synchronous mode of recovery operation, updates are persisted to disk before returning to the user. In doing so, the user is ensured that when the operation completes the written data will survive failures. However, a drawback of this approach is that it is roughly an order-of-magnitude slower than the asynchronous mode of recovery operation. The asynchronous mode expedites updates by performing them only in-memory (RAM) only and periodically flushing them to disk. This reduces write latency and increases throughput but may lead to loss of data that was written shortly before the crash.

In the synchronous mode, the funks always reflect all completed updates. In this case, recovery may be achieved as follows: one can construct the chunks linked list and chunk index from the funks on disk, and then the storage engine is immediately ready to serve new requests, populating munks and Bloom filters on-demand. In the asynchronous mode, recovery is achieved by obtaining a consistent snapshot of the data as described below with reference to FIG. 8.

Figure 8:
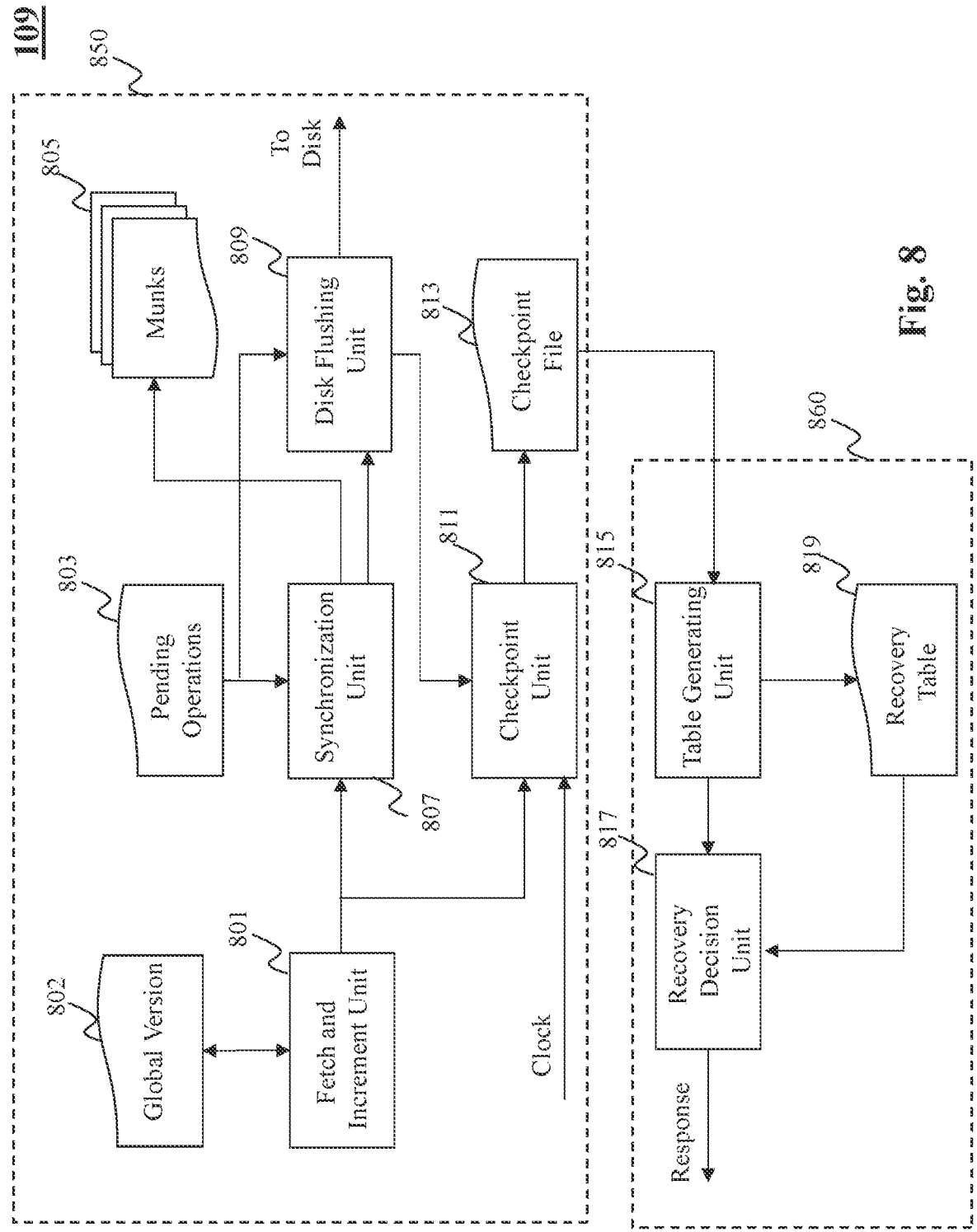
FIG. 8 depicts an exemplary system diagram of a recovery unit, according to an embodiment of the present teaching.

FIG. 8 depicts an exemplary system diagram of a recovery unit 109, according to an embodiment of the present teaching. The recovery unit 109 includes a fetch and increment unit 801, a synchronization unit 807, a disk flushing unit 809, a checkpoint unit 811, a table generating unit 815, and a recovery decision unit 817. According to one embodiment of the present disclosure, the recovery unit 109 obtains a snapshot of the data store at predetermined time intervals and executes a recovery process upon failure. Referring to FIG. 8, the modules/units enclosed in the dotted box labeled 850 perform the former process i.e., obtaining consistent snapshot of the data store, and the modules/unit enclosed in dotted box labeled 860 executes the recovery process upon failure.

To support recovery to a consistent snapshot in the asynchronous mode, a background process periodically creates and persist checkpoints of the data store. For instance, the fetch and incrementing unit 801 fetches and increments global version parameter 802 to obtain a snapshot version (gv). The synchronization unit 807 synchronizes with pending put/write operations via the pending operations (PO) array 803 to ensure that all put operations whose version numbers are smaller than gv are completed. Specifically, all the put operations that have versions number smaller than gv are written to the respective munks 805.

Further, the disk flushing unit 809 flushes all the pending writes to disk. Once the flushing operation is completed, the checkpoint unit 811 writes the value of gv (along with a time obtained from a system clock to a dedicated checkpoint file 813 on disk, indicating that all updates pertaining to versions smaller than or equal to this version (i.e., gv) have been persisted.

Upon recovery from a failure, data can be fetched from the disk into munks on demand in the course of a normal operation mode. However, to ensure consistency following a recovery, retrievals from funks should ignore newer versions that were not included in the latest completed checkpoint before the crash.

It must be appreciated that this must be done by every operation that reads data from a funk—get or scan from a munk-less chunk, funk rebalance, or a munk load. In order to facilitate this checking, versions occurring prior to the crash (i.e., pre-crash versions) must be distinguished from versions created after recovery. By one embodiment, these versions are distinguished using incarnation numbers. Specifically, a version is split into an incarnation number and a per-incarnation version number. The normal mode operation incrementing the GV in effect increases the latter i.e., the per incarnation number. The recovery procedure increments the former i.e., the incarnation number and resets the per incarnation number, so that versions in the new incarnation begin from zero.

According to one embodiment of the present disclosure, the recovery unit 109 maintains a receiver table 819 that maps each recovered incarnation to its last checkpointed version number. For instance, Table I depicts a possible state of the recovery table 819 after two recovery operations i.e., during incarnation number 2.

| Incarnation Number | Last Checkpointed Version |
|---|---|
| 0 | 1370 |
| 1 | 954 |

Every read operation from a funk (during get, scan, funk rebalance, etc.,) refers to the recovery table in order to identify versions that should be ignored—these are versions from old incarnations that exceed the checkpoint number for their incarnation. As shown in FIG. 8, the table generating unit 815 is configured to read the checkpoint entry from the checkpoint file 813 and generate the table by adding a new row to it with the last incarnation and latest checkpoint time. Moreover, the table generating unit 815 may also be configured to increment the incarnation number and reset the per incarnation number and resume normal operation upon recovery.

Figure 9:
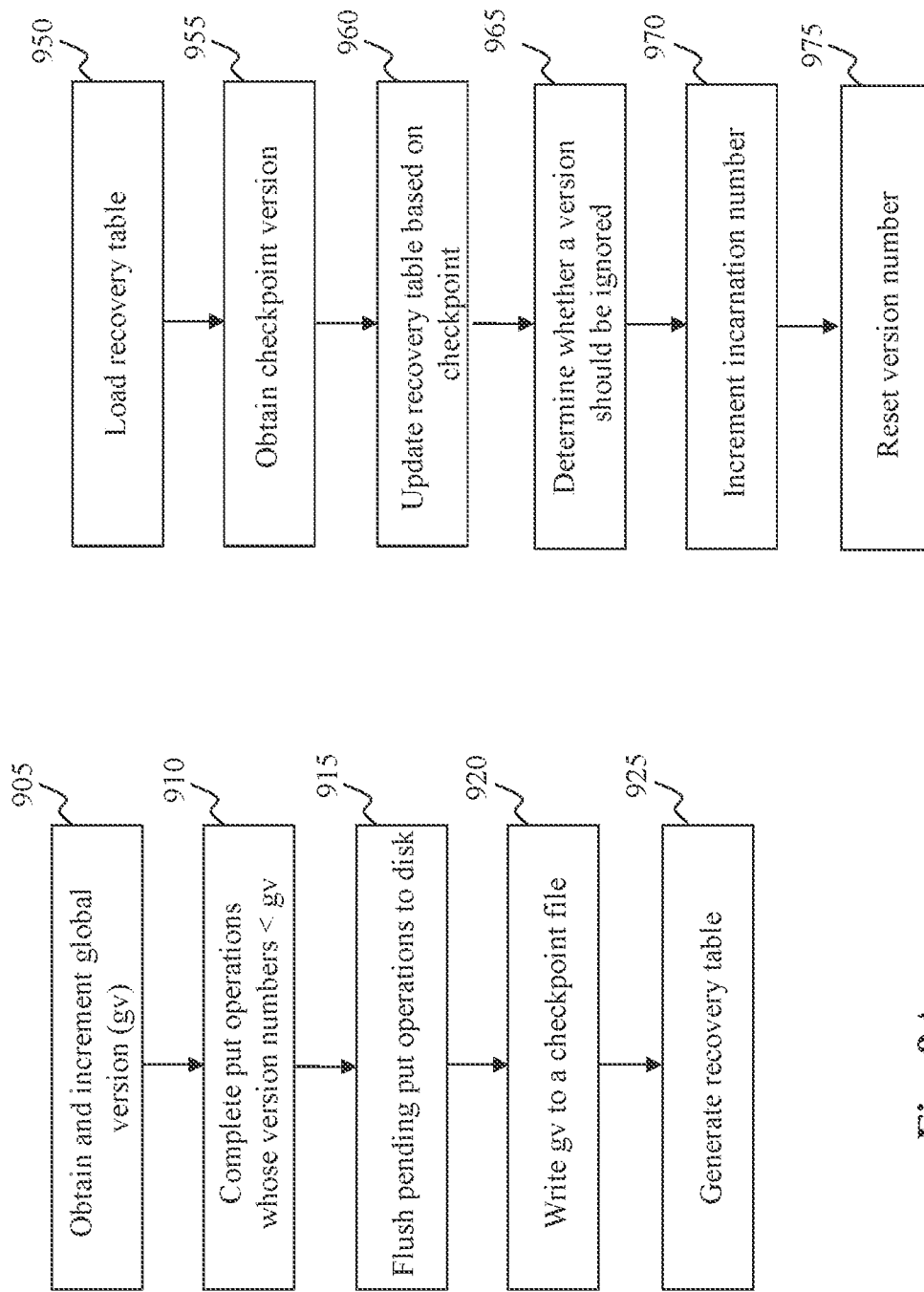
FIG. 9A is a flowchart of an exemplary process performed by a recovery unit, according to an embodiment of the present teaching.
FIG. 9B is a flowchart of an exemplary process performed by a recovery unit, according to an embodiment of the present teaching.

Turning to FIG. 9A, there is depicted a flowchart of an exemplary process performed by a recovery unit, according to an embodiment of the present teaching. Specifically, the flowchart of FIG. 9A represents the steps taken by the process of obtaining a snapshot of the data store at predetermined time-intervals. The process commences in step 905 wherein the global version is obtained and incremented (gv). In step 910, the process commences to complete processing of put operations whose versions numbers are smaller than gv.

Further, the process proceeds to step 915, wherein the pending put operations are flushed to the disk. Upon completion of flushing, the gv (along with the system clock value) is written to a checkpoint file in step 920. Thereafter, in step 925, the process generates a recovery table indicating the last checkpointed version that has been persisted to disk.

FIG. 9B is a flowchart of an exemplary process performed by a recovery unit, according to an embodiment of the present teaching. Specifically, the flowchart of FIG. 9B represents the steps taken by a recovery process that is executed upon failure. The process commences in step 950, wherein the recovery table is loaded into memory. In step 955, the process reads the value of the checkpoint time (and the last checkpointed version) from the checkpoint file.

The process then moves to step 960 wherein the recovery table is updated based on the information obtained in step 955. Specifically, by one embodiment, a new row may be included in the recovery table to include the information obtained in step 920. The process then moves to step 965, wherein a determination is made as to whether a version should be ignored or not. Further, in step 970 the incarnation number is incremented. Thereafter, in step 975, the version number is reset after which normal operation resumes.

Figure 10:
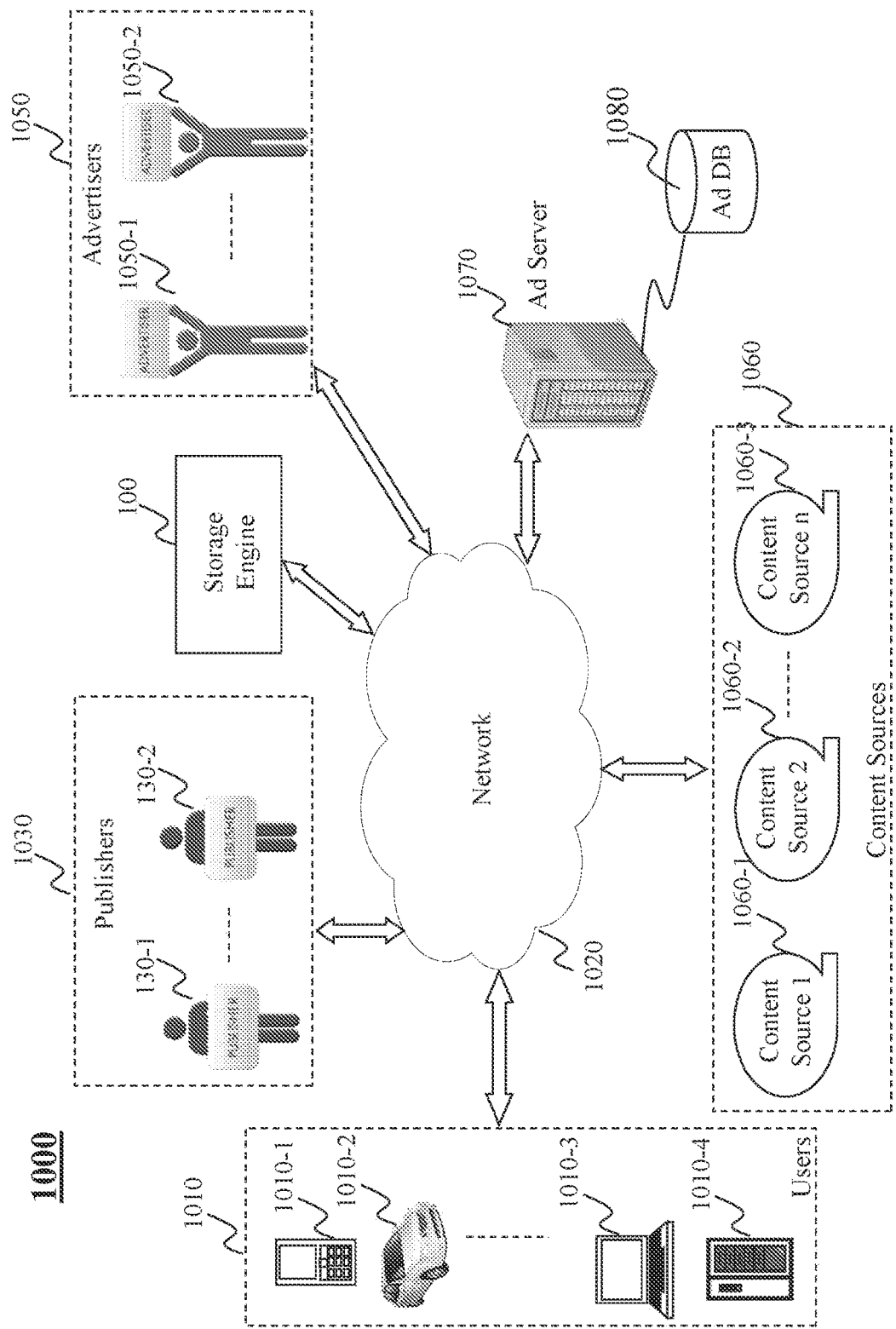
FIG. 10 is a high-level depiction of an exemplary networked environment in which a storage engine operates as an independent service on a network, according to an embodiment of the present teaching.

FIG. 10 is a high-level depiction of an exemplary networked environment in which a storage engine (e.g., a key-value storage engine of FIG. 1) may operate as an independent service on a network, according to an embodiment of the present teaching. Specifically, FIG. 10 depicts the usage of the storage engine 100 in an advertisement environment. The exemplary networked environment 1000 includes users 1010, a network 1020, publishers 1030, a storage engine 100, advertisers 1050, content sources 1060, an ad server 1070, and an ad database 1080. The network 1020 in networked environment 1000 may be a single network or a combination of different networks. For example, a network may be a local area network (LAN), a wide area network (WAN), a public network, a private network, a proprietary network, a Public Telephone Switched Network (PSTN), the Internet, a wireless network, or a virtual network, or any combination thereof.

In one embodiment, the network 1020 may be an online advertising network or an ad network, which connects advertisers 1050 to publishers 1030 or websites/mobile applications that want to host advertisements. A key function of an ad network is aggregation of ad-space supply from publishers and matching it with advertiser demand. An ad network may be a television ad network, a print ad network, an online (Internet) ad network, or a mobile ad network.

Users 1010 may be of different types such as users connected to the network via desktop connections (1010-4), users connecting to the network via wireless connections such as through a laptop (1010-3), a handheld mobile device (1010-1), or a built-in device in a motor vehicle (1010-2). In one embodiment, user(s) 1010 may be connected to the network and able to access and interact with online content (provided by the publishers) through wireless technologies and related operating systems implemented within user-wearable devices (e.g., glasses, wrist watch, etc.). A user, e.g., the user 1010-1, may send a request for online content to one of the publishers, e.g., 1030-1, via the network 1020 and receive content through the network 1020.

Publishers 1030 may correspond to an entity, whether an individual, a firm, or an organization, having publishing business, such as a television station, a newspaper issuer, a web page host, an online service provider, or a game server. For example, in connection to an online or mobile ad network, publishers 1030-1 . . . 1030-2 can be an organization such as USPTO.gov, a content provider such as CNN.com and Yahoo.com, or a content-feed source such as tweeter or blogs. In one embodiment, publishers 1030 include entities that develop, support and/or provide online content via mobile applications (e.g., installed on smartphones, tablet devices, etc.).

Referring to the above example, the content sent to user 1010-1 may be generated by the publisher 1030-1 based on the content sources 1060. A content source may correspond to an entity where the content was originally generated and/or stored. For example, a novel may be originally printed in a magazine, but then posted online at a web site controlled by a publisher. The content sources 1060 in the exemplary networked environment 1000 include multiple content sources 1060-1, 1060-2 . . . 1060-3.

An advertiser, e.g. 1050-1, may correspond to an entity, whether an individual, a firm, or an organization, doing or planning to do (or otherwise involved in) advertising business. As such, an advertiser 1050-1 may be an entity that provides product(s) and/or service(s), and itself handles the advertising process for its own product(s) and/or service(s) at a platform (e.g., websites, mobile applications, etc.) provided by a publisher. For example, advertisers 1050-1 . . . 1050-2 may include companies like General Motors, Best Buy, or Disney. In some other cases, however, an advertiser 1050-1 may be an entity that only handles the advertising process for product(s) and/or service(s) provided by another entity.

When content is sent to the user 1010-1, one or more advertising opportunities may be available for one or more advertisements to be presented with the content to the user 1010-1, on a same web page, via a same application, or in a same user session. For an available advertising opportunity, a request may be sent out to advertisers to solicit bids with respect to the advertising opportunity. The request can be sent out by an ad server 1070 that manages the publisher 1030-1. The ad server here serves as a supply side platform (SSP) for selling one or more advertisement opportunities by soliciting bids from one or more demand side platforms (DSP) and selecting a winning bid among the bids received from the DSPs. The bid request may be sent out to one or more DSPs.

Advertisers 1050 typically target the most receptive audiences with certain traits, based on the product or person the advertiser is promoting. These traits can either be demographic which are focused on race, economic status, sex, age, the level of education, income level and employment or they can be psychographic focused which are based on the consumer's values, personality, attitudes, opinions, lifestyles and interests. They can also be behavioral variables, such as browser history, purchase history, and other recent activity. Targeted advertising is focused on certain traits and the consumers who are likely to have a strong preference will receive the message instead of those who have no interest and whose preferences do not match a product's attribute. As such, the advertisers 1050 can serve advertisements stored in an ad database 180 to the most relevant audience.

By one embodiment of the present teaching, each user 1010 of the system 1000 is associated with a user record e.g., a key-value record. Each user record may include information related to the user, e.g., purchases made by the user, user's click activity, user's dwell time on content provided to the user and the like. Such user records are stored in the storage engine 100. Advertisers 1050 (and/or publishers 1030) typically have targeting criteria (i.e., a set of rules) which enables them to target the most relevant audiences and in turn maximize their return on investments. Moreover, advertisers and/or publishers have stringent service level agreements (SLAs) i.e., SLAs have hard time-constraints. This poses a requirement for the advertisers and/or publishers to be able to gain quick access (and process) to a specific user records stored in the storage engine 100 or a group of user records. In other words, the performance of system 1000 is dependent on having a fast storage engine i.e., a storage engine that has high read, scan, and write throughputs.

It must be appreciated that although the storage engine 100 as described above is in the realm of an advertising setting, it is equally applicable in other applications that require fast data access. Additionally, it must be appreciated that the operations of the storage engine as described herein are applicable to any type of data. Moreover, it must be noted that the configuration of the storage engine 100 in a networked setting is in no way limited to that as shown in FIG. 10. Rather, an alternative configuration (not shown) of a networked environment may include the storage engine 100 being connected to the ad server 1070 as its backend service engine. That is, the storage engine 100 is a special module in the backend of an advertisement server 1070. When there are multiple advertisement servers (not shown), each may have its own backend module for serving various advertiser requirements. A further alternative configuration (not shown) of the networked environment may include the storage engine 100 being connected to the advertiser 150 as its backend service engine. That is, in this embodiment, the storage engine 100 is a special module in the backend of the advertiser 1050. It must be appreciated that multiple advertisers may each have their own backend module (i.e., the storage engine) for providing quick and seamless access to data stored therein.

Figure 11:
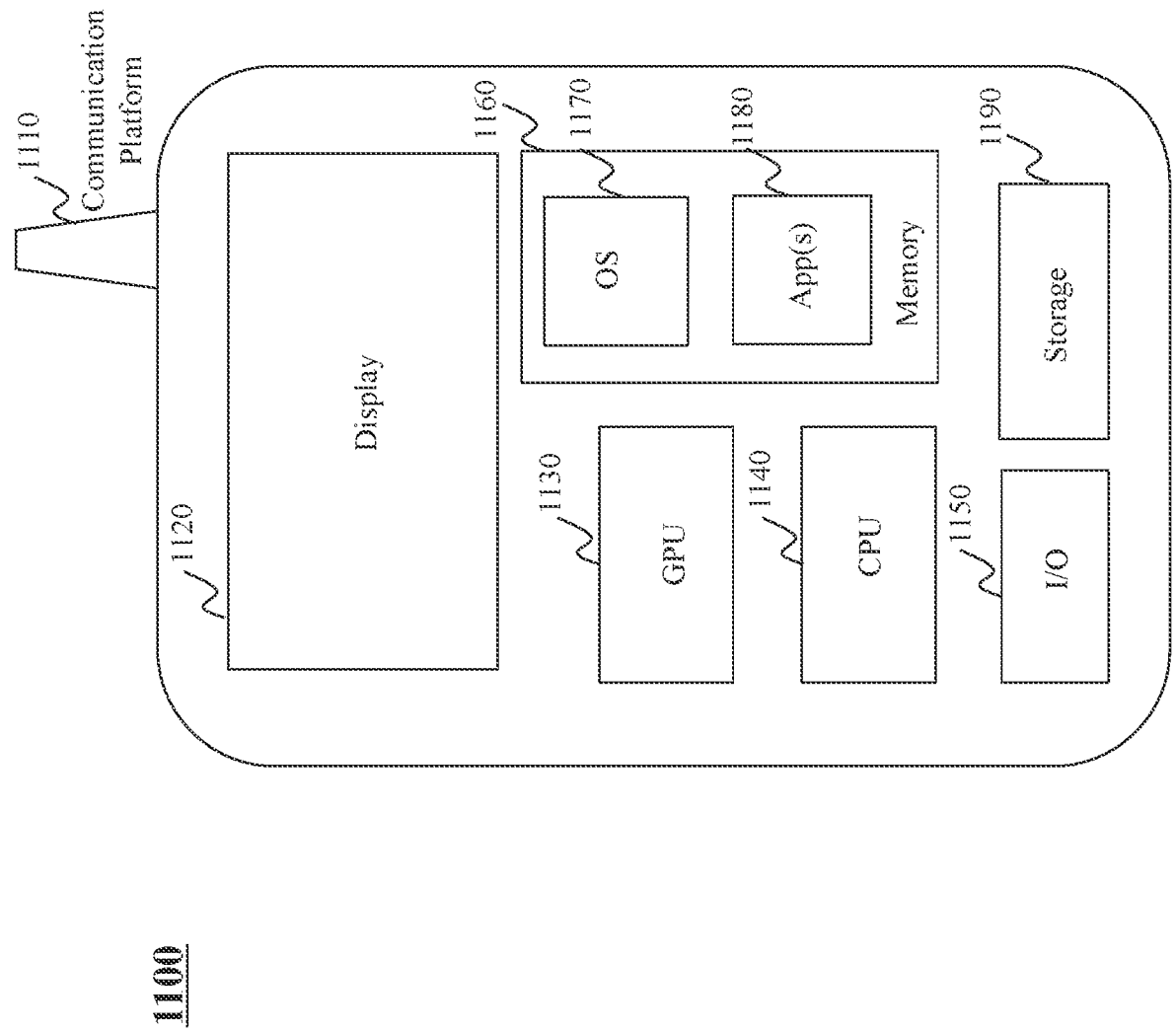
FIG. 11 depicts an architecture of a mobile device which can be used to implement a specialized system incorporating the present teaching.

Turning now to FIG. 11, there is depicted an architecture of a mobile device 1100, which can be used to realize a specialized system implementing the present teaching. In this example, a user device on which the functionalities of the various embodiments described herein can be implemented is a mobile device 1100, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1140. The applications 1180 may include a browser or any other suitable mobile apps for performing the various functionalities on the mobile device 1700. User interactions with the content displayed on the display panel 1120 may be achieved via the I/O devices 1150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
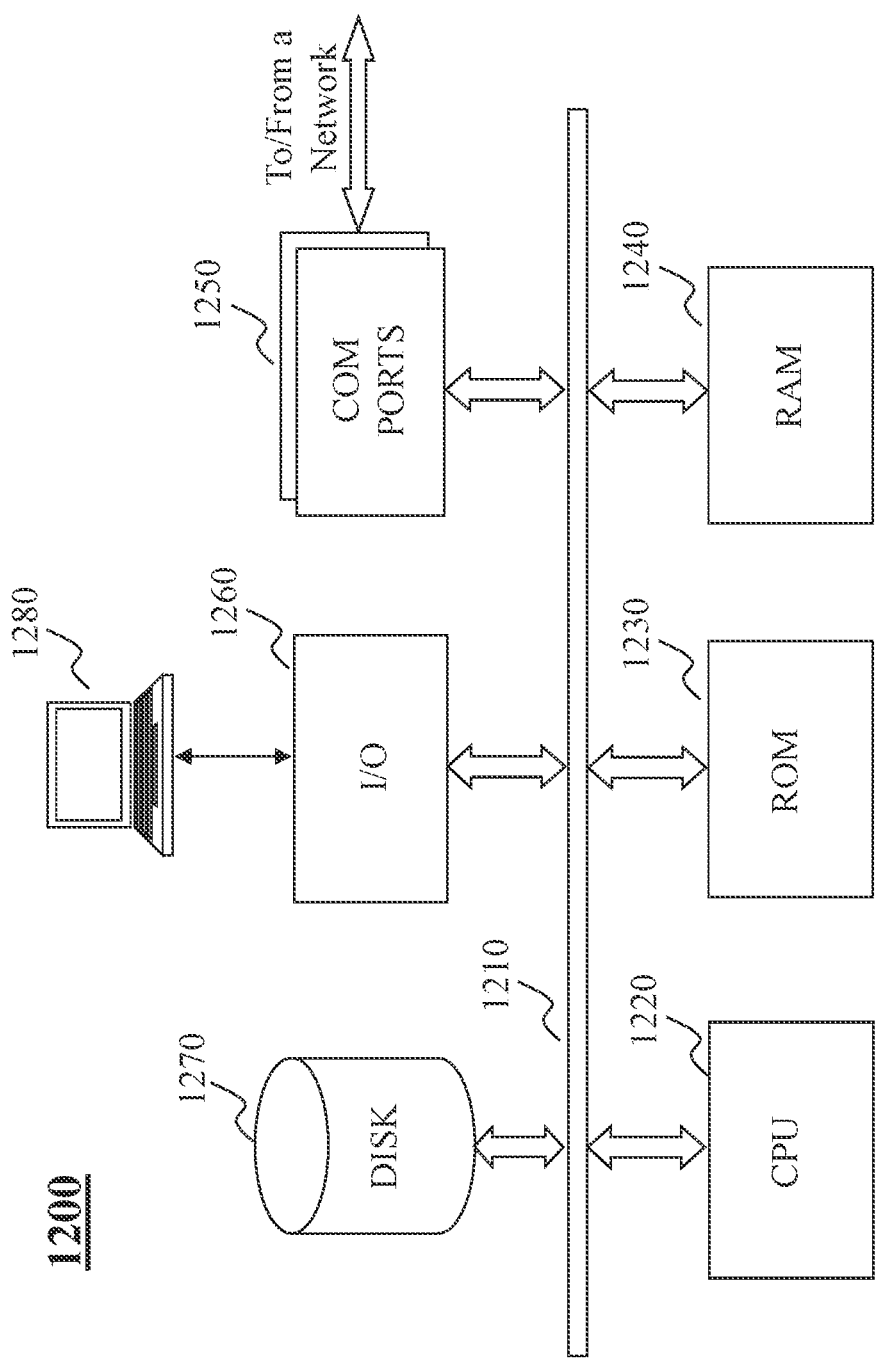
FIG. 12 depicts the architecture of a computer which can be used to implement a specialized system incorporating the present teaching.

FIG. 12 is an illustrative diagram of an exemplary computer system architecture, in accordance with various embodiments of the present teaching. Such a specialized system incorporating the present teaching has a functional block diagram illustration of a hardware platform which includes user interface elements. Computer 1200 may be a general-purpose computer or a special purpose computer. Both can be used to implement a specialized system for the present teaching. Computer 1200 may be used to implement any component(s) described herein. For example, the present teaching may be implemented on a computer such as computer 1200 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1200, for example, may include communication ports 1250 connected to and from a network connected thereto to facilitate data communications. Computer 1200 also includes a central processing unit (CPU) 1220, in the form of one or more processors, for executing program instructions. The exemplary computer platform may also include an internal communication bus 1210, program storage and data storage of different forms (e.g., disk 1270, read only memory (ROM) 1230, or random-access memory (RAM) 1240), for various data files to be processed and/or communicated by computer 1200, as well as possibly program instructions to be executed by CPU 1220. Computer 1200 may also include an I/O component 1260 supporting input/output flows between the computer and other components therein such as user interface elements 1280. Computer 1200 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the storage engine into the hardware platform(s) of a computing environment or other system implementing a computing environment or similar functionalities in connection with the storage engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the storage engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for recovering a data storage, the method comprising:
   in response to a failure of the data storage,
      retrieving, from a checkpoint file created previously for the failure of the data storage, a last checkpointed version;
      updating a recovery table to indicate the last checkpointed version and an incarnation number indicating a number of previous recovery of the data storage;
      recovering, based on the recovery table, the data storage;
      resetting, upon a successful recovery of the data storage, a version number of the last checkpointed version to zero; and
      incrementing the incarnation number.

2. The method of claim 1, further comprising preparing for recovering the data storage, where in the step of preparing comprises:
   obtaining a global version associated with the data storage;
   completing put operations having version numbers smaller than a version number of the global version by writing the put operations into a first portion of the data storage;
   flushing pending put operations to a second portion of the data storage; and updating the checkpoint file, in the second portion, to indicate the last checkpointed version to be the global version.

3. The method of claim 2, wherein the first portion is an in-memory portion of the data storage and the second portion is a disk portion of the data storage.

4. The method of claim 2, wherein the step of preparing for recovering the data storage is performed according to a schedule.

5. The method of claim 2, wherein the step of preparing for recovering the data storage is performed at each of predetermined time intervals.

6. The method of claim 1, wherein the recovery table maps the last checkpointed version to the incarnation number.

7. The method of claim 1, wherein the step of recovering comprises:
ignoring, based on the recovery table, a version from the previous recovery and newer than the last checkpointed version in the previous recovery.

8. A machine readable and non-transitory medium having information recorded thereon for recovering a data storage, wherein the information, when read by the machine, causes the machine to perform:
in response to a failure of the data storage,
retrieving, from a checkpoint file created previously for the failure of the data storage, a last checkpointed version;
updating a recovery table to indicate the last checkpointed version and an incarnation number indicating a number of previous recovery of the data storage;
recovering, based on the recovery table, the data storage;
resetting, upon a successful recovery of the data storage, a version number of the last checkpointed version to zero; and
incrementing the incarnation number.

9. The machine readable and non-transitory medium of claim 8, wherein the information, when read by the machine, causes the machine to further perform preparing for recovering the data storage, where in the step of preparing comprises:
obtaining a global version associated with the data storage;
completing put operations having version numbers smaller than a version number of the global version by writing the put operations into a first portion of the data storage;
flushing pending put operations to a second portion of the data storage; and
updating the checkpoint file, in the second portion, to indicate the last checkpointed version to be the global version.

10. The machine readable and non-transitory medium of claim 9, wherein the first portion is an in-memory portion of the data storage and the second portion is a disk portion of the data storage.

11. The machine readable and non-transitory medium of claim 9, wherein the step of preparing for recovering the data storage is performed according to a schedule.

12. The machine readable and non-transitory medium of claim 9, wherein the step of preparing for recovering the data storage is performed at each of predetermined time intervals.

13. The machine readable and non-transitory medium of claim 8, wherein the recovery table maps the last checkpointed version to the incarnation number.

14. The machine readable and non-transitory medium of claim 8, wherein the step of recovering comprises:
ignoring, based on the recovery table, a version from the previous recovery and newer than the last checkpointed version in the previous recovery.

15. A system for recovering a data storage, the system comprising a processor and a memory including instructions executed by the processor to perform operations comprising:
in response to a failure of the data storage,
retrieving, from a checkpoint file created previously for the failure of the data storage, a last checkpointed version;
updating a recovery table to indicate the last checkpointed version and an incarnation number indicating a number of previous recovery of the data storage;
recovering, based on the recovery table, the data storage;
resetting, upon a successful recovery of the data storage, a version number of the last checkpointed version to zero; and
incrementing the incarnation number.

16. The system of claim 15, wherein the instructions are executed by the processor to further perform preparing for recovering the data storage, where in the step of preparing comprises:
obtaining a global version associated with the data storage;
completing put operations having version numbers smaller than a version number of the global version by writing the put operations into a first portion of the data storage;
flushing pending put operations to a second portion of the data storage; and
updating the checkpoint file, in the second portion, to indicate the last checkpointed version to be the global version.

17. The system of claim 16, wherein the first portion is an in-memory portion of the data storage and the second portion is a disk portion of the data storage.

18. The system of claim 16, wherein the step of preparing for recovering the data storage is performed according to a schedule.

19. The system of claim 15, wherein the recovery table maps the last checkpointed version to the incarnation number.

20. The system of claim 15, wherein the step of recovering comprises:
ignoring, based on the recovery table, a version from the previous recovery and newer than the last checkpointed version in the previous recovery.

* * * * *